US012183315B2

(12) United States Patent
Huang et al.

(10) Patent No.: US 12,183,315 B2
(45) Date of Patent: Dec. 31, 2024

(54) AUDIO DETECTION METHOD AND APPARATUS, COMPUTER DEVICE, AND READABLE STORAGE MEDIUM

(71) Applicant: Tencent Technology (Shenzhen) Company Limited, Shenzhen (CN)

(72) Inventors: Zhengyue Huang, Shenzhen (CN); Xintian Shi, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 232 days.

(21) Appl. No.: 17/974,452

(22) Filed: Oct. 26, 2022

(65) Prior Publication Data

US 2023/0050565 A1 Feb. 16, 2023

Related U.S. Application Data

(63) Continuation of application No. PCT/CN2021/126022, filed on Oct. 25, 2021.

(30) Foreign Application Priority Data

Nov. 25, 2020 (CN) ......................... 202011336979.1

(51) Int. Cl.
*G10H 7/08* (2006.01)

(52) U.S. Cl.
CPC ......... *G10H 7/08* (2013.01); *G10H 2210/031* (2013.01); *G10H 2250/235* (2013.01)

(58) Field of Classification Search
CPC ............................... G06F 16/683; G06F 16/60
(Continued)

(56) References Cited

U.S. PATENT DOCUMENTS 10,665,265 B2 * 5/2020 Benedetto ............ G11B 27/031
2008/0172225 A1 7/2008 Kim et al.
(Continued)

FOREIGN PATENT DOCUMENTS

CN 104599663 A 5/2015
CN 107103917 A 8/2017
(Continued)

OTHER PUBLICATIONS

Tencent Technology, ISR, PCT/CN2021/126022, Dec. 14, 2021, 2 pgs.
(Continued)

*Primary Examiner* — Alexander Krzystan
(74) *Attorney, Agent, or Firm* — Morgan, Lewis & Bockius LLP

(57) ABSTRACT

This application provide an audio detection method performed by a computer device. The method includes: acquiring a target time point and a reference point of the target time point from target audio data; performing energy evaluation on the target time point according to an audio amplitude value of the target time point to obtain an energy evaluation value of the target time point; performing energy evaluation on the reference point according to an audio amplitude value of the reference point to obtain an energy evaluation value of the reference point; performing accuracy verification on the target time point according to the energy evaluation value of the target time point and the energy evaluation value of the reference point; and if the accuracy verification on the target time point succeeds, adding the target time point as a target stress point into a target stress point set.

20 Claims, 10 Drawing Sheets

(58) Field of Classification Search
USPC .............................................................. 700/94
See application file for complete search history.

(56) References Cited

U.S. PATENT DOCUMENTS

| | | | | |
|---|---|---|---|---|
| 2012/0033132 | A1* | 2/2012 | Chen | G11B 27/28 348/E7.001 |
| 2018/0286458 | A1* | 10/2018 | Harron | G06F 16/438 |
| 2020/0357369 | A1 | 11/2020 | Wu | |
| 2022/0020348 | A1* | 1/2022 | Kusakabe | G10H 1/368 |
| 2022/0121623 | A1* | 4/2022 | Lyske | G06F 9/52 |

FOREIGN PATENT DOCUMENTS

| | | | |
|---|---|---|---|
| CN | 108319657 | A | 7/2018 |
| CN | 108335703 | A | 7/2018 |
| CN | 108877776 | A | 11/2018 |
| CN | 109670074 | A | 4/2019 |
| CN | 109903775 | A | 6/2019 |
| CN | 110336960 | A | 10/2019 |
| CN | 110890083 | A | 3/2020 |
| CN | 111081271 | A | 4/2020 |
| CN | 111105769 | A | 5/2020 |
| CN | 111128232 | A | 5/2020 |
| CN | 111833900 | A | 10/2020 |
| CN | 112435687 | A | 3/2021 |
| EP | 3671725 | A1 | 6/2020 |
| JP | 2018072368 | A | 5/2018 |

OTHER PUBLICATIONS

Tencent Technology, WO, PCT/CN2021/126022, Dec. 14, 2021, 5 pgs.
Tencent Technology, IPRP, PCT/CN2021/126022, May 30, 2023, 6 pgs.
Tencent Technology, Extended European Search Report, EP Patent Application No. 21896679.4, Apr. 23, 2024, 18 pgs.

* cited by examiner

AUDIO DETECTION METHOD AND APPARATUS, COMPUTER DEVICE, AND READABLE STORAGE MEDIUM

CROSS-REFERENCE TO RELATED APPLICATIONS

This application is a continuation application of PCT Patent Application No. PCT/CN2021/126022, entitled "AUDIO DETECTION METHOD AND APPARATUS, COMPUTER DEVICE AND READABLE STORAGE MEDIUM" filed on Oct. 25, 2021, which claims priority to Chinese Patent Application No. 202011336979.1, filed with the State Intellectual Property Office of the People's Republic of China on Nov. 25, 2020, and entitled "AUDIO DETECTION METHOD AND APPARATUS, COMPUTER DEVICE, AND READABLE STORAGE MEDIUM", all of which are incorporated herein by reference in their entirety.

FIELD OF THE TECHNOLOGY

This application relates to the field of Internet, specifically, to the field of multimedia technologies, and in particular, to an audio detection method and apparatus, a computer device, and a readable storage medium.

BACKGROUND OF THE DISCLOSURE

At present, as video has gradually become an important means of dissemination of content, sync-to-beat video has gradually become a very popular type of video creation among video creators. The sync-to-beat video is characterized by synchronizing the picture with the stress rhythm point of the music, so that the audience can feel a consistent sense of rhythm visually and auditorily, thereby bringing a more comfortable sensory experience. Stress points are a key factor in video creation. In order to make the sync-to-beat effect more impactful and suitable for showing short video content, some important stress points need to be determined from audio. Therefore, how to acquire stress points from audio data has become a research hotspot.

SUMMARY

Embodiments of this application provide an audio detection method and apparatus, a computer device, and a readable storage medium, which can more accurately determine stress points in target audio data.

According to an aspect, an embodiment of this application provides an audio detection method performed by a computer device, including:

acquiring a target time point and a reference point of the target time point from target audio data, the target audio data including a plurality of time points and an audio amplitude value of each time point, and the reference point referring to a time point with a time difference from the target time point being less than a first difference threshold;

performing energy evaluation on the target time point according to an audio amplitude value of the target time point to obtain an energy evaluation value of the target time point; performing energy evaluation on the reference point according to an audio amplitude value of the reference point to obtain an energy evaluation value of the reference point;

performing accuracy verification on the target time point according to the energy evaluation value of the target time point and the energy evaluation value of the reference point; and when the accuracy verification on the target time point succeeds, adding the target time point as a target stress point into a target stress point set.

According to another aspect, an embodiment of this application provides an audio detection apparatus, including:

an acquiring unit, configured to acquire a target time point and a reference point of the target time point from target audio data, the target audio data including a plurality of time points and an audio amplitude value of each time point, and the reference point referring to a time point with a time difference from the target time point being less than a first difference threshold;

a processing unit, configured to perform energy evaluation on the target time point according to an audio amplitude value of the target time point to obtain an energy evaluation value of the target time point; and perform energy evaluation on the reference point according to an audio amplitude value of the reference point to obtain an energy evaluation value of the reference point;

the processing unit, further configured to perform accuracy verification on the target time point according to the energy evaluation value of the target time point and the energy evaluation value of the reference point; and the processing unit, further configured to, when the accuracy verification on the target time point succeeds, add the target time point as a target stress point into a target stress point set.

According to still another aspect, an embodiment of this application provides a computer device. The computer device includes an input device and an output device. The computer device further includes:

a processor, suitable for implementing one or more instructions; and a computer storage medium, storing one or more instructions, the one or more instructions being suitable to be loaded by the processor to perform the following steps:

acquiring a target time point and a reference point of the target time point from target audio data, the target audio data including a plurality of time points and an audio amplitude value of each time point, and the reference point referring to a time point with a time difference from the target time point being less than a first difference threshold;

performing energy evaluation on the target time point according to an audio amplitude value of the target time point to obtain an energy evaluation value of the target time point; performing energy evaluation on the reference point according to an audio amplitude value of the reference point to obtain an energy evaluation value of the reference point;

performing accuracy verification on the target time point according to the energy evaluation value of the target time point and the energy evaluation value of the reference point; and when the accuracy verification on the target time point succeeds, adding the target time point as a target stress point into a target stress point set.

According to still another aspect, an embodiment of this application provides a computer storage medium. The computer storage medium stores one or more instructions. The one or more instructions are suitable to be loaded by the processor to perform the following steps:

acquiring a target time point and a reference point of the target time point from target audio data, the target audio data including a plurality of time points and an audio amplitude value of each time point, and the reference point referring to a time point with a time difference from the target time point being less than a first difference threshold;

performing energy evaluation on the target time point according to an audio amplitude value of the target time point to obtain an energy evaluation value of the target time point; performing energy evaluation on the reference point according to an audio amplitude value of the reference point to obtain an energy evaluation value of the reference point;

performing accuracy verification on the target time point according to the energy evaluation value of the target time point and the energy evaluation value of the reference point; and when the accuracy verification on the target time point succeeds, adding the target time point as a target stress point into a target stress point set.

BRIEF DESCRIPTION OF THE DRAWINGS

To describe the technical solutions of the embodiments of this application or the related art more clearly, the following briefly introduces the accompanying drawings required for describing the embodiments or the related art. Apparently, the accompanying drawings in the following description show only some embodiments of this application, and a person of ordinary skill in the art may still derive other drawings from these accompanying drawings without creative efforts.

DESCRIPTION OF EMBODIMENTS

The technical solutions in the embodiments of this application are clearly described in the following with reference to the accompanying drawings in the embodiments of this application. Apparently, the described embodiments are merely some embodiments of this application rather than all of the embodiments. All other embodiments obtained by a person of ordinary skill in the art based on the embodiments of this application without making creative efforts shall fall within the protection scope of this application.

Figure 1A:
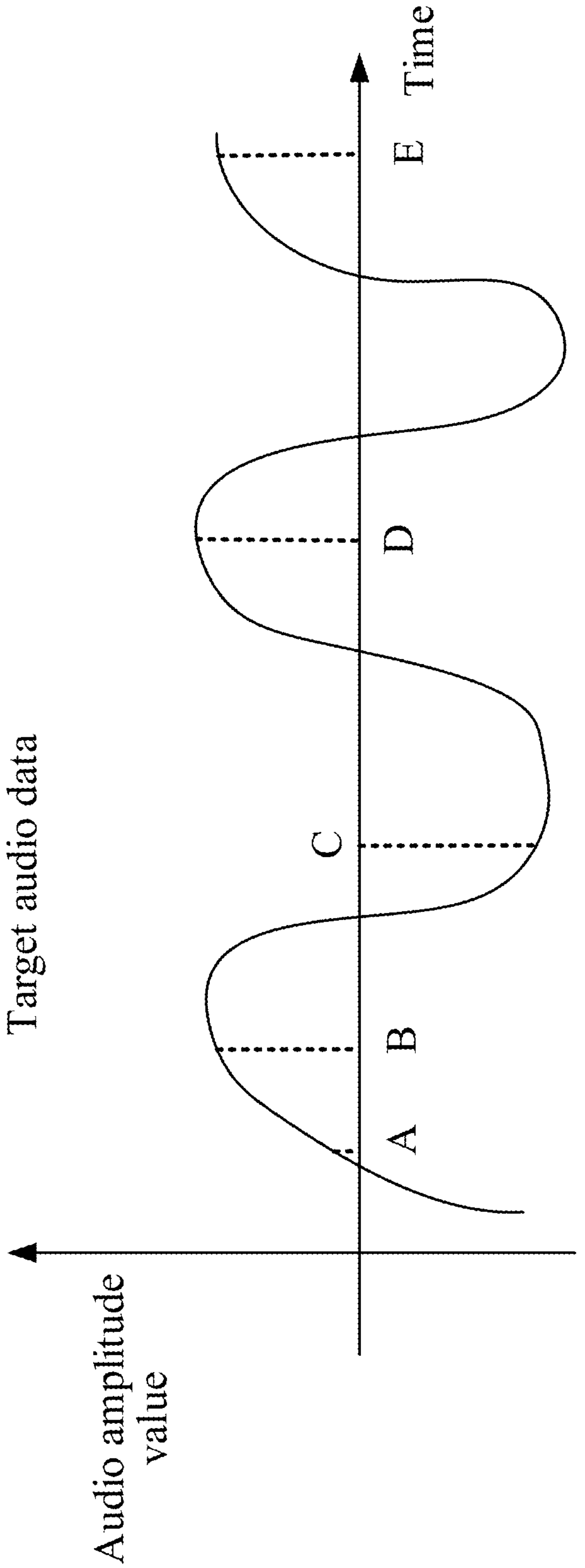
FIG. 1A is a schematic diagram of an audio waveform according to an embodiment of this application.
Figure 1B:
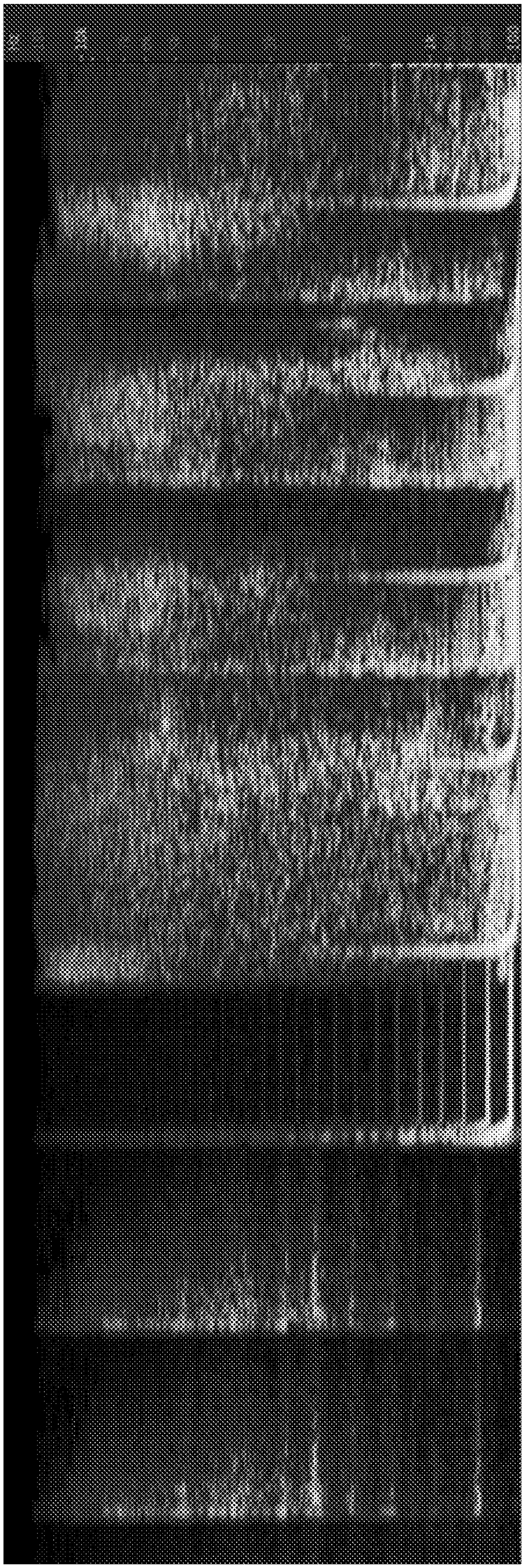
FIG. 1B is a schematic diagram of a frequency spectrum according to an embodiment of this application.

Audio data is a type of digitized sound data, which may be audio data from video files or audio data from pure audio files. The process of digitizing sound is actually the process of performing analog-to-digital conversion on continuous analog audio signals from a terminal device at a certain frequency to obtain audio data. Specifically, the audio data may include a plurality of time points (also referred to as music points) and an audio amplitude value of each time point; and to a certain extent, an audio waveform may be drawn by using time points and corresponding audio amplitude values to visually show audio data. For example, referring to an audio waveform shown in FIG. 1A, audio amplitude values of time points A, B, C, D, and E in audio data can be visually shown through the audio waveform. In addition to the attribute of audio amplitude value, each time point may also include sound attributes such as sound frequency, energy, volume, and timbre. The sound frequency refers to the number of times an object completes full vibration in a single time point. The sound frequencies of the time points can form a frequency spectrum shown in FIG. 1B. The volume, also referred to as sound intensity or loudness, refers to the subjective perception of the intensity of sound heard by human ears. The timbre, also referred to as tone quality, is used to reflect features of the sound produced based on an audio amplitude value of each time point.

Figure 1C:
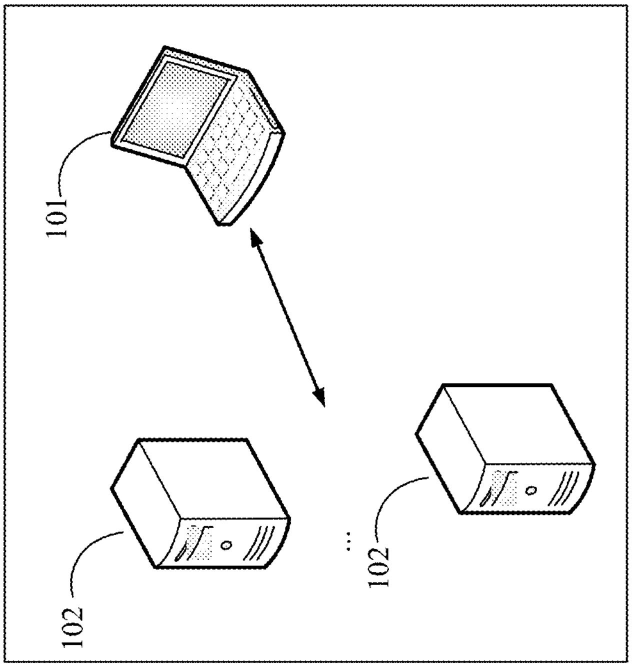
FIG. 1C is a schematic structural diagram of an audio detection system according to an embodiment of this application.

In order to better extract stress points from audio data, an embodiment of this application provides an audio detection solution. An execution entity of the audio detection solution may be a computer device. The computer device may be a terminal device (terminal for short below) or a server. When the computer device is a server, an embodiment of this application also provides an audio detection system shown in FIG. 1C. The audio detection system may include at least one terminal 101 and a server 102, that is, the computer device. In the audio detection system, the terminal 101 and the server 102 may be directly or indirectly connected in a wired or wireless communication manner. This is not limited in the embodiments of this application. It is to be noted that, the terminal mentioned above may be a smartphone, a tablet computer, a notebook computer, or a desktop computer; and the server may be an independent physical server, or may be a server cluster or a distributed system formed by a plurality of physical servers, or may be a cloud server that provides basic cloud computing services such as a cloud service, a cloud database, cloud computing, a cloud function, cloud storage, a network service, cloud communication, a middleware service, a domain name service, a security service, a content delivery network (CDN), and a big data and AI platform.

In a specific implementation, the general principle of the audio detection solution mentioned above is as follows. When it is necessary to extract stress points from audio data of any type (such as lyrical type or rock type), the computer device may extract a plurality of initial stress points from the audio data. The plurality of initial stress points herein may include: time points with local maximum energy, volume, and timbre, and/or time points where energy, volume, and timbre suddenly change. For any initial stress point, an audio amplitude value of the initial stress point and an audio amplitude value of a time point adjacent to the initial stress point in the audio data may be comprehensively analyzed, so that accuracy verification is further performed on the initial stress point according to the comprehensive analysis results; and after the verification succeeds, the initial stress point is used as a target stress point of the audio data. In an embodiment, due to various external factors, the initial stress points extracted by the computer device may be insufficient, and other time points other than these initial stress points in the audio data, which may also be stress points, may be omitted. Therefore, the computer device may supplementally extract some new supplementary points (that is, other time points other than the initial stress points) from the audio data; and may comprehensively analyze the new supplementary points by using the comprehensive analysis method involved in any initial stress point, and use, after it is determined that accuracy verification on the new supplementary points succeeds according to the comprehensive analysis results, the new initial stress points as target stress points of the audio data.

It can be learned from the above description that different types of audio data may be recognized adaptively through the audio detection solution; and the initial stress points such as the time points with local maximum energy, volume, and timbre or the time points that suddenly change are recognized from the audio data, and the accuracy verification is performed on the initial stress points by further using the correlation between the adjacent time points and the initial stress points, so that the extraction accuracy of stress points can be effectively improved, thereby providing a target stress point set accurate to the frame level (that is, the time point level). In addition, supplementary point sampling is performed on the audio data, and accuracy verification is performed on new supplementary points, which can also improve the comprehensiveness of the target stress point set.

Figure 2:
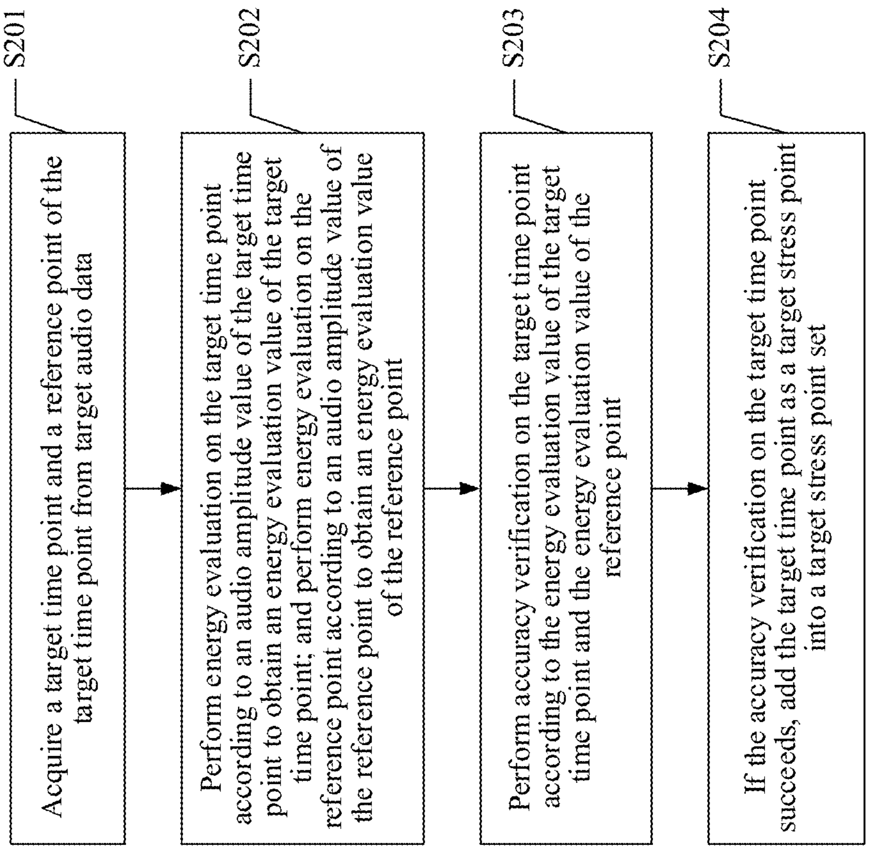
FIG. 2 is a schematic flowchart of an audio detection method according to an embodiment of this application.

Based on the above audio detection solution provided, an embodiment of this application provides an audio detection method. The audio detection method may be performed by the computer device mentioned above. Referring to FIG. 2, the audio detection method may include the following steps S201 to S204.

S201. Acquire a target time point and a reference point of the target time point from target audio data.

The target audio data may be audio data of any type, such as audio data of lyrical type, audio data of rock type, or audio data of classical type. The target audio data may include a plurality of time points and an audio amplitude value of each time point. The target time point may be obtained through any one of the following implementations.

In a specific implementation, the computer device may extract an initial stress point set from target audio data according to a point extraction algorithm (such as the librosa.beat algorithm) in the open-source tool libsora (an audio processing tool). The principle of the point extraction algorithm is as follows: According to a main beat of target audio data, time points with local maximum energy, volume, and timbre, and/or time points where energy, volume, and timbre suddenly change are extracted from the target audio data as initial stress points. The main beat refers to the most important beat of the audio data. The so-called beat is the basic unit of time of the audio data, which refers to the combination rule of strong beats and weak beats. The beat can realize that there are segments having the same duration with strong and weak beats in the audio data to repeat in a certain order. After the initial stress point set is obtained, accuracy verification may be performed on each initial stress point in the initial stress point set sequentially by using the audio detection method provided in the embodiments of this application. In this specific implementation, a specific implementation of step S201 may include: randomly selecting an initial stress point from an initial stress point set as a target time point. That is, the target time point in this implementation is any initial stress point in the initial stress point set.

In a specific implementation, the principle of the point extraction algorithm mentioned above is to extract stress points by considering the main beat, but there may be a small quantity of stress points deviating from the main beat in the target audio data, and these stress points deviating from the main beat may be missed by the point extraction algorithm. For example, the beats involved in a start/end region of the target audio data may not conform to the main beat, then stress points in the start/end region may be considered as the stress points deviating from the main beat, so when stress points are extracted by using the point extraction algorithm, the stress points in the start/end region are usually not extracted. Therefore, in order to improve the accuracy and comprehensiveness of stress points, the computer device may also perform extended sampling outward in the target audio data based on the initial stress point set to obtain a supplementary time point set, and perform accuracy verification on each supplementary point in the supplementary time point set sequentially by using the audio detection method provided in the embodiments of this application. In this specific implementation, a specific implementation of step S201 may include: randomly selecting a supplementary point from a supplementary time point set as a target time point. That is, the target time point in this implementation is any supplementary point in the supplementary time point set.

Studies have shown that if the target time point is a relatively accurate stress point, there need to be time points with local large energy and volume or time points where energy and volume suddenly change in the target time point and time points adjacent to the target time point. Based on this, the computer device may also acquire a time point within a certain time range near the target time point as a reference point of the target time point, so as to facilitate the subsequent accuracy verification on the target time point with reference to an audio amplitude value of the reference point. An upper limit of the certain time range may be equal to a value obtained by adding a first difference threshold on the basis of the target time point, and a lower limit of the certain time range may be equal to a value obtained by subtracting the first difference threshold on the basis of the target time point. That is, the reference point refers to a time point with a time difference from the target time point being less than a first difference threshold. The first difference threshold may be set according to empirical values or service requirements.

Figure 3:
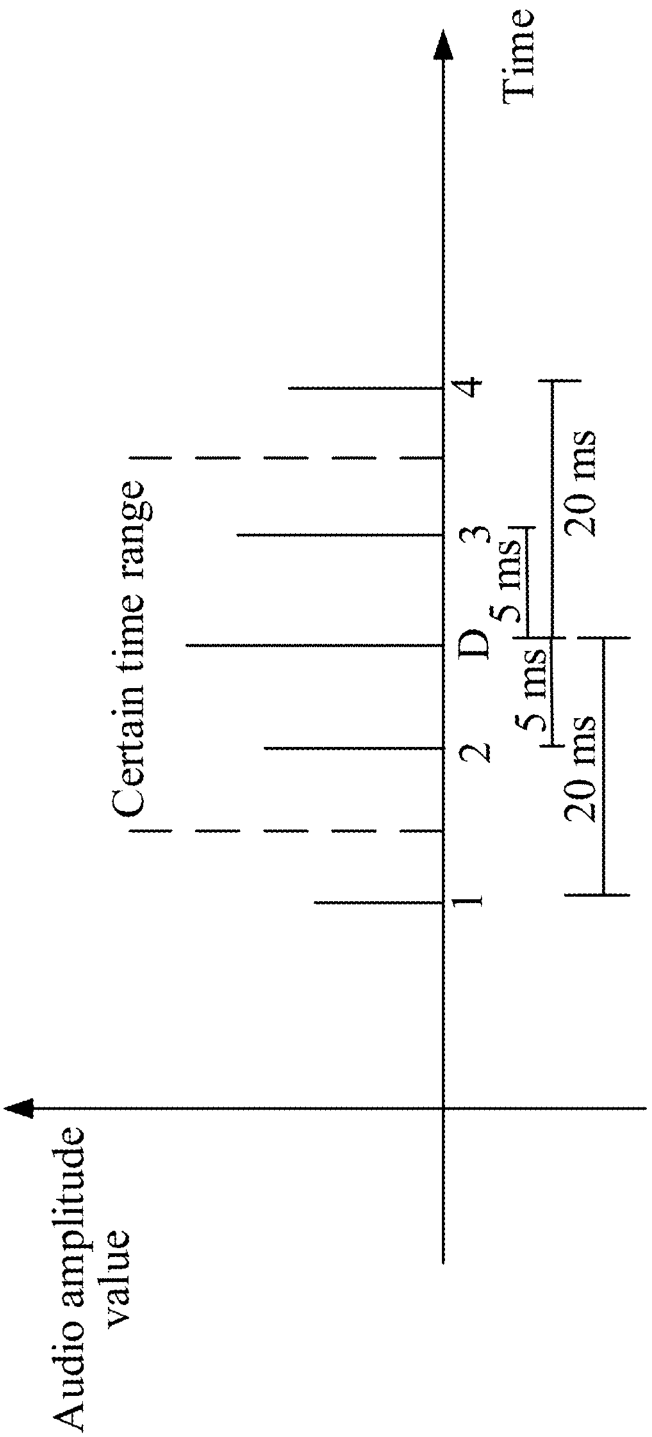
FIG. 3 is a schematic diagram of determining a reference point of a target time point according to an embodiment of this application.

For example, the first difference threshold is 10 ms, indicating that the certain time range may be 10 ms before and after the target time point. As shown in FIG. 3, assuming that point D is a target time point, the computer device may calculate differences between the target time point and other time points such as time point 1, time point 2, time point 3, and time point 4 respectively in target audio data. It can be obtained through calculation that time difference D1 between time point 1 and target time point D is 20 ms, time difference D2 between time point 2 and target time point D is 5 ms, time difference D3 between time point 3 and target time point D is 5 ms, and time difference D4 between time point 4 and target time point D is 20 ms. Then, whether D1, D2, D3, and D4 are less than 10 ms may be determined sequentially. Only D2 and D3 are less than the first difference threshold, so time point 2 and time point 3 are used as the reference points of the target time point. It is to be noted that, the description herein is made only using the four time points of time point 1, time point 2, time point 3, and time point 4 as an example. In the actual calculation process, the computer device may calculate differences between the target time point and all other time points respectively in the target audio data to obtain time points with the differences less than the first difference threshold as the reference points. That is, the reference point includes time points within 10 ms before and after the target time point.

S202. Perform energy evaluation on the target time point according to an audio amplitude value of the target time point to obtain an energy evaluation value of the target time point; and perform energy evaluation on the reference point according to an audio amplitude value of the reference point to obtain an energy evaluation value of the reference point.

In a specific implementation, the computer device may acquire an audio energy function on a frequency domain to calculate audio energy values of the target time point and the reference point respectively.

In a specific implementation, the computer device may use an audio energy function on a time domain to calculate audio energy values of the target time point and the reference point respectively. Compared with the audio energy function on the frequency domain, the audio energy function on the time domain has a higher calculation speed and a higher temporal resolution. In the embodiments of this application, after the audio energy function on the time domain and the audio energy function on the frequency domain are tested, it is found that the audio energy function on the time domain has a better detection effect on the target time point during the test. The time domain refers to the analysis on the time-related part of a function or signal. The frequency domain refers to the analysis on the frequency domain-related part of a function or signal.

In a specific implementation, the computer device may first determine an audio energy value of the target time point according to the audio amplitude value of the target time point and the audio energy function, and determine an audio energy change value of the target time point according to the audio energy value of the target time point and an audio energy change function; and then the computer device performs weighted summation on the audio energy value and the audio energy change value of the target time point to determine the energy evaluation value of the target time point, as shown in formula 1.1:

$$F=c_0\cdot E+c_1\cdot\delta \qquad \text{Formula 1.1}$$

E represents the audio energy value of the target time point, δ represents the audio energy change value of the target time point, F represents the energy evaluation value of the target time point, $c_0$ and $c_1$ are two constants that can be used to control the weight or proportion of the audio energy value and the audio energy change value of the target time point, and $c_0$ and $c_1$ may be set based on experience, satisfying that the sum of $c_0$ and $c_1$ is 1. For example, $c_0$ may be 0.1, and $c_1$ may be 0.9.

It is to be noted that, the calculation method of the energy evaluation value of the reference point may refer to the calculation method of the energy evaluation value of the target time point, and details are not described herein.

S203. Perform accuracy verification on the target time point according to the energy evaluation value of the target time point and the energy evaluation value of the reference point.

It may be learned from the above that the energy evaluation value may include a maximum energy evaluation value and a mean. The stress point is usually a time point where the energy is high or suddenly changes, so it may be detected whether there is a point where the energy changes or suddenly changes near the target time point according to the energy evaluation value of the target time point and the energy evaluation value of the reference point. If there is, it can be considered that the target time point is a more accurate stress point. In this case, the target time point may be added into a target stress point set as a target stress point through step S204.

In an implementation, the computer device may determine a maximum energy evaluation value from the energy evaluation value of the target time point and the energy evaluation value of the reference point and determine whether the maximum energy evaluation value is greater than an energy evaluation threshold. If the maximum energy evaluation value is greater than the energy evaluation threshold, it indicates that there is a time point where the energy is high near the target time point, and it is determined that the accuracy verification on the target time point succeeds. If the maximum energy evaluation value is less than or equal to the energy evaluation threshold, it indicates that there is no time point where the energy is high near the target time point, and it is determined that the accuracy verification on the target time point fails. The energy evaluation threshold may be set based on experience.

In an implementation, the computer device may perform a mean operation on the energy evaluation value of the target time point and the energy evaluation value of the reference point and determine whether the mean is greater than a mean evaluation threshold. If the mean is greater than the mean evaluation threshold, it indicates that the energy of the time points near the target time point is high, it further indicates that there is a time point where the energy is high, and it is determined that the accuracy verification on the target time point succeeds. If the mean is less than or equal to the mean evaluation threshold, it indicates that the energy of the time points neat the target time point is low, it further indicates that there is no time point where the energy is high, and it is determined that the accuracy verification on the target time point fails. The mean evaluation threshold may be set based on experience.

In an implementation, to accurately determine whether there is a time point where the energy is high or suddenly changes near the target time point, comprehensive evaluation may be performed based on the energy evaluation value and the mean of the target time point. Based on this, the computer device may determine a maximum energy evaluation value and a mean according to the energy evaluation value of the target time point and the energy evaluation value of the reference point, and then perform accuracy verification on the target time point according to the maximum energy evaluation value and the mean.

S204. If the accuracy verification on the target time point succeeds, add the target time point as a target stress point into a target stress point set.

In an implementation, if the accuracy verification on the target time point succeeds, the computer device may directly add the target time point as a target stress point into a target stress point set. In an implementation, to increase the accuracy of screening the target time point, in an embodiment of this application, secondary screening may be further performed on the target time point. The computer device screens the target time point according to a local maximum amplitude value of the target time point. If the local maximum amplitude value is greater than a first amplitude threshold, the computer device may add the target time point as the target stress point into the target stress point set.

In an embodiment of this application, the computer device may acquire a target time point and a reference point of the target time point from target audio data, and then the computer device performs energy evaluation on the target time point according to an audio amplitude value of the target time point to obtain an energy evaluation value of the target time point. Then, energy evaluation is performed on the reference point according to an audio amplitude value of the reference point to obtain an energy evaluation value of the reference point. Accuracy verification is performed on the target time point according to the energy evaluation value of the target time point and the energy evaluation value of the reference point. If the accuracy verification on the target time point succeeds, the target time point is added as a target stress point into a target stress point set. In the above process of audio detection, the accuracy verification is performed on the target time point by using the correlation between the adjacent reference point and the target time point, so that the extraction accuracy of stress points can be effectively improved, thereby providing a target stress point set accurate to the frame level (that is, the time point level).

Figure 4:
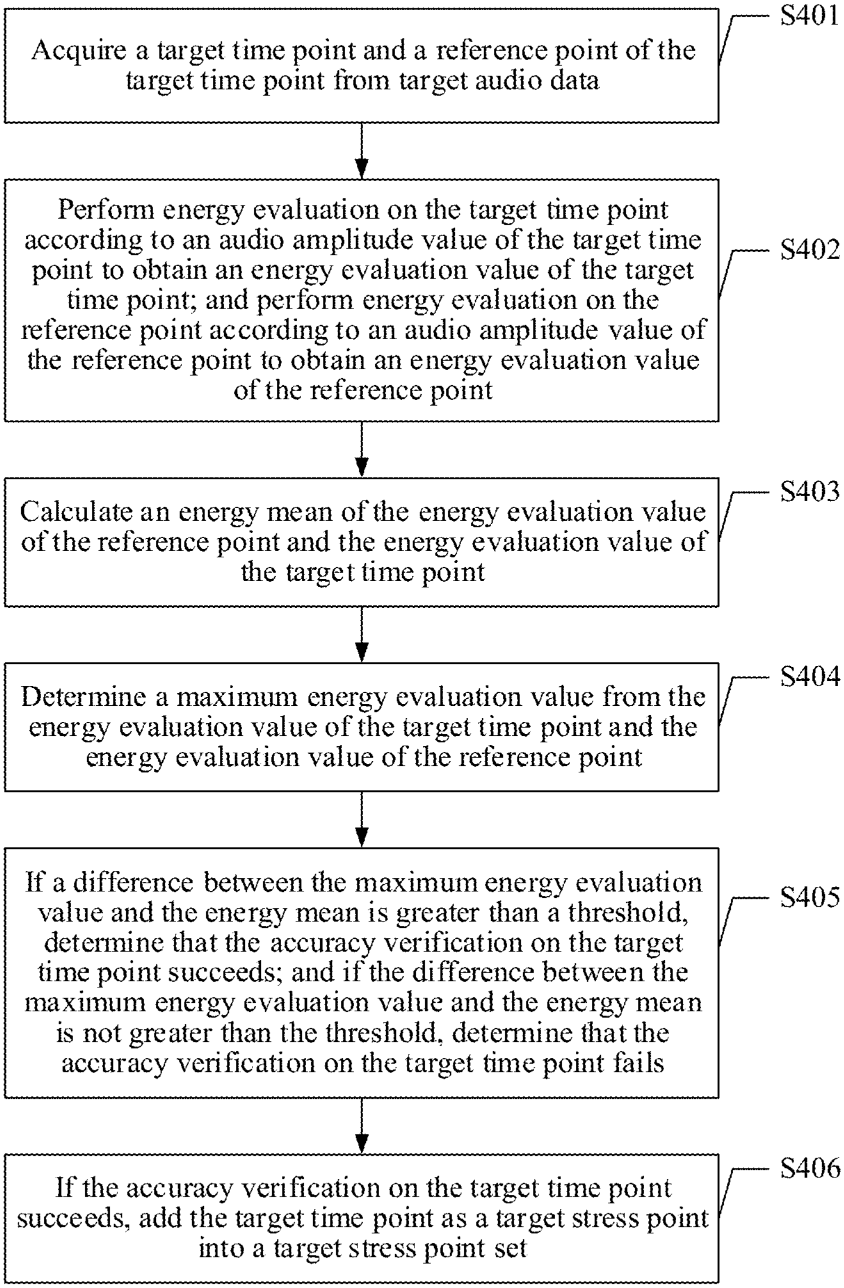
FIG. 4 is a schematic flowchart of another audio detection method according to an embodiment of this application.

Referring to FIG. 4, FIG. 4 is a schematic flowchart of another audio detection method according to an embodiment of this application. The audio detection method described in this embodiment may be performed by a computer device and may include the following steps S401-S406:

S401. Acquire a target time point and a reference point of the target time point from target audio data.

In a specific implementation process, the computer device may first acquire the target audio data. Specifically, the computer device may acquire original audio data from a video or other data sources. Each time point in the original audio data has a corresponding sound frequency. The other data sources may be network or local space. Then, the original audio data is pre-processed to obtain the target audio data. The pre-processing may include at least one of the following (1)-(3):

(1) The original audio data is filtered by using a target frequency range. In a specific implementation, the target frequency range may be set based on experience. For example, the target frequency range is set as 10-5000 HZ. The computer device adopts the target frequency range, which can effectively filter out the low-frequency audio and noise that the human ear cannot hear and also filter out the high-frequency components such as ventilation sound and friction sound in some audio data; and can only leave time points within the target frequency range that are useful for the acquisition of stress points, avoid noise interference, and obtain relatively clean target audio data, thereby reducing the difficulty of subsequent recognition of stress points in the target audio data.

(2) Volume normalization is performed on the original audio data. In a specific implementation, since the volume of the acquired original audio data is inconsistent, the computer device may perform normalization according to a maximum value and a minimum value of a sound waveform in the original audio data. The normalization refers to uniformly maintaining the volume in the audio data between the maximum value and the minimum value. For example, the volume in the audio data is normalized between −1 and 1 to reduce the difficulty of subsequent screening stress points in the target audio data.

(3) The original audio data is first filtered by using the target frequency range, and the volume normalization is performed on the filtered audio data, so that the difficulty of subsequent recognition and screening of stress points in the target audio data is reduced.

After the target audio data is acquired, a target time point and a reference point of the target time point may be acquired from the target audio data. As can be learned from the above description, the target time point may be any initial stress point in an initial stress point set, or the target time point may be any supplementary point in a supplementary time point set. A plurality of initial stress points in the initial stress point set are obtained by performing point extraction on the target audio data by using a point extraction algorithm. As mentioned in the embodiment shown in FIG. 2, the supplementary time point set is obtained by performing extended sampling outward in the target audio data based on the initial stress point set. Specifically, the plurality of time points in the target audio data are arranged in chronological order, and the supplementary time point set is acquired by the following steps.

Figure 5A:
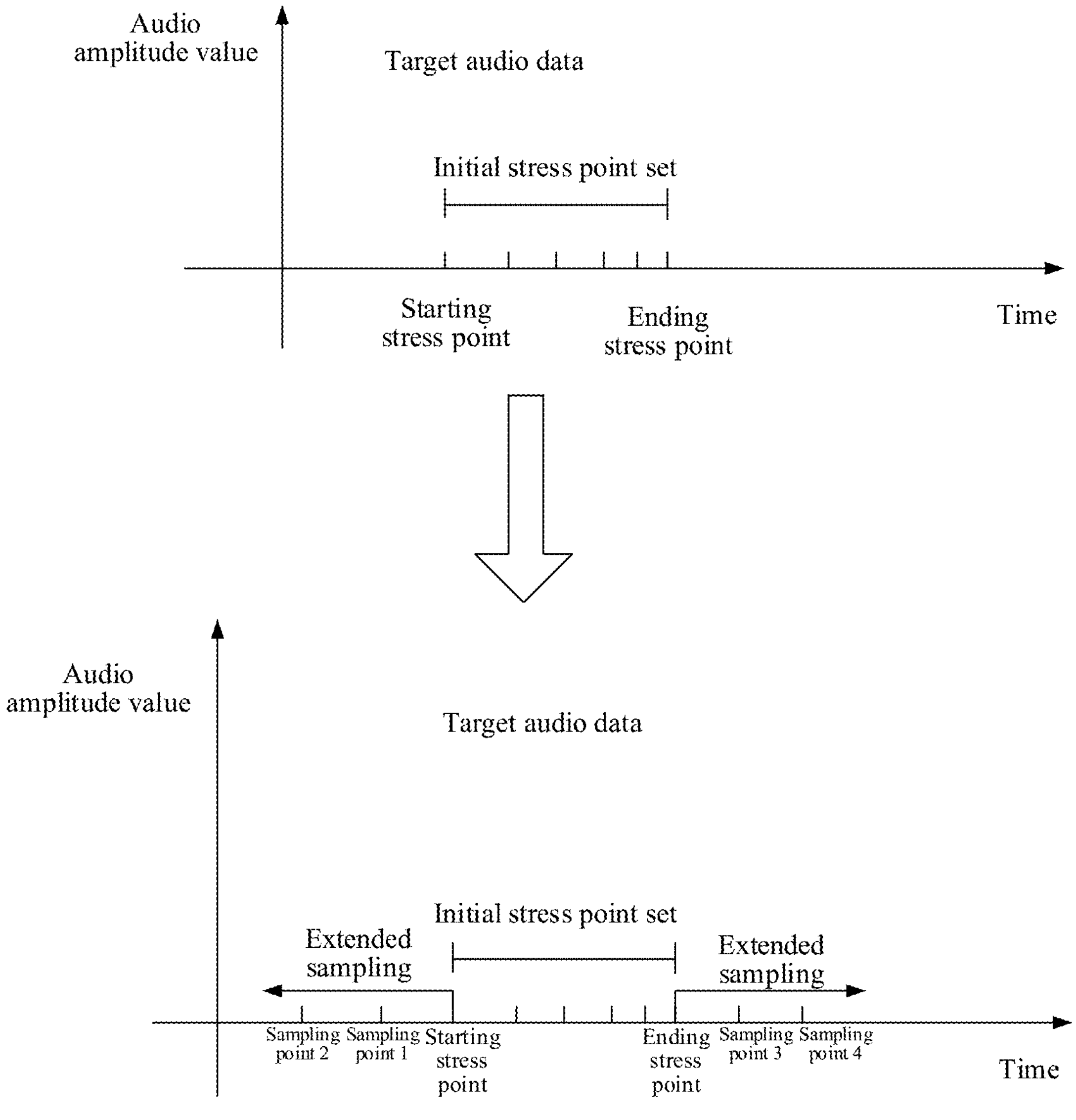
FIG. 5A is a schematic diagram of generating an initial stress point set and a supplementary time point set according to an embodiment of this application.

The computer device determines a starting stress point and an ending stress point from the initial stress point set. The starting stress point refers to the earliest stress point in the initial stress point set. The ending stress point refers to the latest stress point in the initial stress point set. The computer device determines a starting arrangement position of the starting stress point in the target audio data and an end arrangement position of the ending stress point in the target audio data. The starting arrangement position of the starting stress point and the end arrangement position of the ending stress point are shown in FIG. 5A. Further, the computer device performs extended sampling of a time point located before the starting arrangement position in the target audio data according to a sampling frequency, and performs extended sampling of a time point located after the end arrangement position in the target audio data according to the sampling frequency. The extended sampling direction may refer to FIG. 5A. The time point obtained through extended sampling is used as a supplementary point, and the supplementary point is added into the supplementary time point set. For example, in FIG. 5A, sampling is performed according to the sampling frequency 10 ms to obtain 4 sampling points shown in FIG. 5A, and time points corresponding to the 4 sampling points are added as supplementary points into the supplementary time point set.

S402. Perform energy evaluation on the target time point according to an audio amplitude value of the target time point to obtain an energy evaluation value of the target time point; and perform energy evaluation on the reference point according to an audio amplitude value of the reference point to obtain an energy evaluation value of the reference point.

In a specific implementation, the calculation method of the energy evaluation value of the target time point is similar to the calculation method of the energy evaluation value of the reference point. For convenience of description, the following descriptions are given by using the target time point as an example. Specifically, a specific implementation of performing energy evaluation on the target time point according to an audio amplitude value of the target time point to obtain an energy evaluation value of the target time point may include the following steps s11-*s*15.

s11. Acquire a plurality of associated points of the target time point from the plurality of time points.

The associated point refers to a time point with a time difference from the target time point being less than a second difference threshold. The second difference threshold may be set based on experience. For example, the second difference threshold may be set to $$\left\lfloor \frac{k}{2} \right\rfloor, \text{ and } \left\lfloor \frac{k}{2} \right\rfloor$$

means rounding $$\frac{k}{2}$$

down. k may be set according to an empirical value. For example, if k is equal to 2000 ms, $$\frac{k}{2}$$

(that is, 1000 ms) is rounded down to obtain $$\left\lfloor \frac{k}{2} \right\rfloor$$

as 1000 ms; and if k is equal to 2001 ms, $$\frac{k}{2}$$

(that is, 1000.5 ms) is rounded down to obtain $$\left\lfloor \frac{k}{2} \right\rfloor$$

as 1000 ms. When $$\left\lfloor \frac{k}{2} \right\rfloor$$

is 1000 ms, the associated points include time points within 1000 ms before and after the target time point.

s12. Calculate an audio energy value of the target time point by using an audio energy function according to audio amplitude values of the associated points and the audio amplitude value of the target time point.

In a specific implementation, the plurality of time points are arranged in chronological order. Correspondingly, the target audio data may be represented as a one-dimensional array $y=[y_1, y_2, \ldots, y_n]$. $y_x$ represents an audio amplitude value of an $x^{th}$ time point in the target audio data, $i \in [1, n]$. The audio energy function may be shown by formula 1.2:

$$E_i = \frac{1}{k'} \sum_{j=i-\left\lfloor \frac{k}{2} \right\rfloor}^{i+\left\lfloor \frac{k}{2} \right\rfloor} y_j^2 \quad \text{Formula 1.2}$$

k' represents a quantity of associated points of the target time point, and k' may be determined according to the value of k. When k is odd, k' is equal to k; and when k is even, k' is equal to k+1. j represents the index in the summation symbol, and the value of i is equal to the arrangement number of the target time point in the target audio data. It is to be noted that, when the value of j is less than or equal to 0, the value of $y_j$ is 0.

It is to be noted that, this embodiment of this application is described by using the target time point as an example, and the calculation of audio energy values of other time points (including the above reference point) may refer to the calculation method of the target time point. After the audio energy values of all time points are calculated, the audio energy function may be regarded as a discrete function, so the audio energy values of all time points may form an array $E=[E_1, E_2 \ldots, E_n]$.

Based on this, a specific implementation of step s12 may include: performing a square operation on the audio amplitude value of the target time point to obtain an initial energy value of the target time point; performing a square operation on the audio amplitude value of each associated point to obtain an initial energy value of each associated point; and performing a mean operation on the initial energy value of the target time point and initial energy values of the associated points to obtain the audio energy value of the target time point. Specifically, the computer device performs a mean operation on the initial energy value of the target time point and the initial energy values of the associated points to obtain an intermediate energy value. Then, the intermediate energy value is directly used as the audio energy value of the target time point; or the intermediate energy value is denoised to obtain the audio energy value of the target time point.

A specific implementation of denoising the intermediate energy value to obtain the audio energy value of the target time point may be as follows. The computer device may form a curve of the intermediate energy value changing with the time point by using the intermediate energy values of all time points, and perform a curve smoothing operation by using Gaussian filtering or box filtering to adjust the intermediate energy value of the target time point, so as to obtain the audio energy value of the target time point. Through denoising, noise interference can be removed, to obtain the audio energy value of a relatively clean target time point.

s13. Acquire a preceding point of the target time point from the plurality of time points.

The preceding point includes: c time points selected forward in sequence based on an arrangement position of the target time point in the plurality of time points, c being a positive integer. c is an adjustable parameter. For example, c may be equal to 15. Under the condition of c=15, the interference of local abnormal values can be alleviated, so that the audio energy change value can better reflect the sudden change of a volume peak in a local period of time. It may be understood that setting the value of c based on experience can change the acquired preceding point, and c can also be used to control a quantity of forward difference summations.

s14. Calculate an audio energy change value of the target time point by using an audio energy change function according to the audio energy value of the target time point and audio energy values of time points in the preceding point.

In a specific implementation, the audio energy change function may be shown by formula 1.3:

$$\delta_i' = \max\left(0, c\cdot E_i - \sum_{j=1,\ldots c} E_{i-j}\right) \quad \text{Formula 1.3}$$

$\delta_i'$ represents the initial energy change value, $E_i$ represents the audio energy value, j represents the index in the summation symbol, and c is an adjustable parameter and can be used to control a quantity of forward difference summations and a quantity of preceding points. For example, when c=1, this function calculates the first-order mean difference of the energy function. The target time point is an $i^{th}$ point. The preceding point of the target time point may include an $(i-1)^{th}$ point, an $(i-2)^{th}$ point, . . . , an $(i-c)^{th}$ point. $E_{i-j}$ represents an audio energy value of an $(i-j)^{th}$ time point.

Based on this, a specific implementation of step s14 may be as follows. The computer device calculates a sum of the audio energy values of the time points in the preceding point, and acquires a reference value (for example, the reference value may be 0). Then, a difference between the sum of the audio energy values and c times the audio energy value of the target time point is calculated, and a maximum value from the reference value and the obtained difference through calculation is used as an initial energy change value of the target time point. Finally, the audio energy change value of the target time point is determined according to the initial energy change value of the target time point.

Figure 5B:
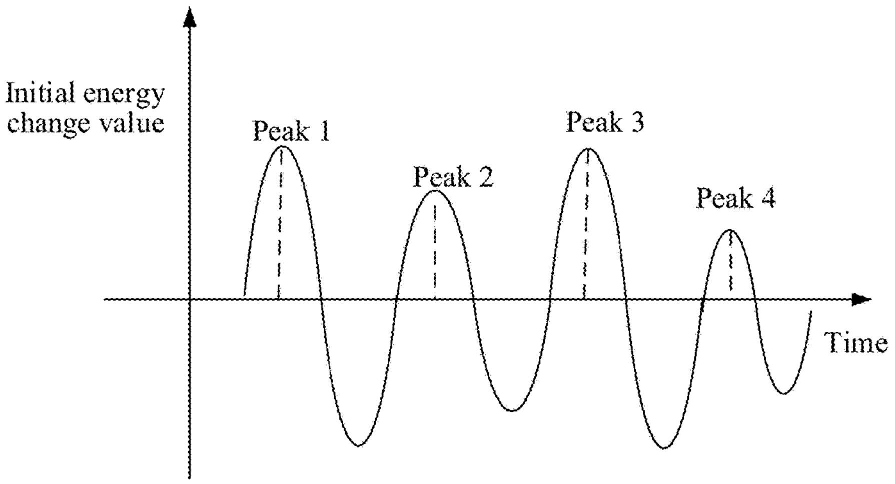
FIG. 5B is a schematic diagram of acquiring a plurality of peaks from time points according to an embodiment of this application.

In an implementation, the computer device may directly use the initial energy change value of the target time point as the audio energy change value of the target time point. In another implementation, the initial energy value of the target time point has a wide range, so it is necessary to normalize the initial energy value of the target time point. In an embodiment of this application, a normalization method pk_normalize is defined. The normalization method refers to performing normalization on the target time point by using a mean of n peaks of maximum initial energy values of the time points in the target audio data. Compared with the simple 0-1 normalization, this normalization can avoid the influence of some abnormally large audio energy change values, and in addition, the strategy of only selecting the n maximum peaks can avoid many noise peaks with small audio energy change values to cause screening errors. In an implementation, the computer device may acquire initial energy change values of time points in the target audio data, and determine a plurality of peaks from the initial energy change values of the time points. The peak refers to an initial energy change value of a peak time point in the target audio data. The peak time point satisfies the following conditions: The initial energy change value of the peak time point is greater than an initial energy change value of each of two time points respectively on left and right sides of the peak time point and adjacent to the peak time point. For example, in FIG. 5B, 4 peaks may be determined from the initial energy change values of the time points, respectively peak 1, peak 2, peak 3, and peak 4. The computer device normalizes the initial energy change value of the target time point by using a mean of the plurality of peaks to obtain the audio energy change value of the target time point.

That the computer device normalizes the initial energy change value of the target time point by using a mean of the plurality of peaks to obtain the audio energy change value of the target time point includes the following two situations. (1) The computer device directly calculates a mean according to the plurality of peaks, and then normalizes the initial energy change value of the target time point by using the obtained mean. (2) The computer device may sort the plurality of peaks, then acquire n peaks in descending order from the plurality of peaks that are sorted, and calculate a mean of the n peaks. The computer device normalizes the initial energy change value of the target time point according to the mean obtained through calculation. The value of n may be set based on experience. For example, the value of n may be set to ⅓ of the quantity of peaks. For example, the value of n is set to 3, in FIG. 5B, the computer device sorts 4 peaks acquired in descending order, that is, the order of the 4 peaks is peak 1, peak 3, peak 2, and peak 4. The computer device may acquire 3 peaks in descending order, respectively peak 1, peak 2, and peak 3.

In an implementation, a specific implementation of normalizing the initial energy change value of the target time point by using a mean of the plurality of peaks to obtain the audio energy change value of the target time point is as follows. The computer device acquires audio energy values of time points and determines a minimum audio energy value from the audio energy values of the time points, and performs contraction on the initial energy change value of the target time point by using the mean of the plurality of peaks and the minimum audio energy value to obtain the audio energy change value of the target time point. The minimum audio energy value may be represented by min(E). The mean of the plurality of peaks may be represented by mean(topn(peak(δ'))). peak(δ') represents determining peaks (corresponding to the plurality of peaks) of all initial energy change values in the target audio data. topk(peak(δ')) represents selecting n peaks in descending order from all peaks. The specific calculation process of performing contraction on the initial energy change value of the target time point by using mean(topn(peak(δ')) of the plurality of peaks and min(E) to obtain the energy change value δ of the target time point may refer to formula 1.4:

$$\delta = \text{pk\_normalize}(\delta') = \frac{\delta' - \min(E)}{a\cdot \text{mean}(top_k(\text{peak}(\delta')))} \quad \text{Formula 1.4}$$

In formula 1.4, a is an adjustable parameter and can finely adjust and control the audio energy change value of the final target time point. The value of a may be set based on experience. For example, a may be 1.5.

s15. Perform weighted summation on the audio energy value and the audio energy change value to obtain the energy evaluation value of the target time point.

S403. Calculate an energy mean of the energy evaluation value of the reference point and the energy evaluation value of the target time point.

S404. Determine a maximum energy evaluation value from the energy evaluation value of the target time point and the energy evaluation value of the reference point.

S405. If a difference between the maximum energy evaluation value and the energy mean is greater than a threshold, determine that the accuracy verification on the target time point succeeds; and if the difference between the maximum energy evaluation value and the energy mean is not greater than the threshold, determine that the accuracy verification on the target time point fails.

The threshold may be set as the condition for whether the accuracy verification on the target time point succeeds. The threshold may also be understood as the condition for screening the target time point. In a specific implementation, the computer device may first calculate a difference between the maximum energy evaluation value and the energy mean and determine whether the difference between the maximum energy evaluation value and the energy mean is greater than a threshold. If the difference between the maximum energy evaluation value and the energy mean is greater than the threshold, it is determined that the accuracy verification on the target time point succeeds, that is, it may be understood that the target time point is a time point where the energy changes greatly. If the difference between the maximum energy evaluation value and the energy mean is less than or equal to the threshold, it is determined that the accuracy verification on the target time point fails, that is, it may be understood that the target time point is a time point where the energy changes slightly.

S406. If the accuracy verification on the target time point succeeds, add the target time point as a target stress point into a target stress point set.

In a specific implementation, after the verification on the target time point through step S405, the computer device may add the target time point on which the verification succeeds as the target stress point into the target stress point set. The target stress point set may be represented by $R_0$. All stress point sets in the target stress point set satisfy formula 1.5:

$$R_0=\{i=F_{max}[i]>F_{mean}[i]+s_0, i\in\{\text{beat}\}\}\qquad \text{Formula 1.5}$$

The maximum energy evaluation value is Fmax[i]. The mean is Fmean[i]. i∈{beat} represents the target time point. The screening threshold is $s_0$ and may be set based on experience. In an implementation, if the target time point is any initial stress point in the initial stress point set, the screening threshold may be set to a small value. For example, the screening threshold may be set to 0.1. In another implementation, if the target time point is any supplementary point in the supplementary time point set, to avoid false detection of the target time point, the screening threshold may be properly increased. For example, the screening threshold may be set to 0.3.

In an implementation, if the accuracy verification on the target time point succeeds, the computer device may also determine whether the target time point is a stress point according to the local maximum amplitude value in the target audio data. That is, the computer device may further screen the target time point according to the local maximum amplitude value of the target time point, so as to increase the accuracy of screening the stress point. In a specific implementation, the computer device selects, from absolute values of audio amplitude values of the associated points and an absolute value of the audio amplitude value of the target time point, a maximum absolute value as a local maximum amplitude value of the target time point. The local maximum amplitude value of the target time point may be calculated by using a waveform local maximum amplitude function according to formula 1.6:

$$A_i=\max_{i-\lfloor\frac{k}{2}\rfloor<j<i+\lfloor\frac{k}{2}\rfloor}\text{abs}(y_i)\qquad \text{Formula 1.6}$$

In formula 1.6, abs(•) means to obtain an absolute value of a variable; i represents the current target time point; and j represents the iteration variable of the max operation, and represents the associated point. The associated point refers to a time point with a time difference from the target time point being less than a second difference threshold. The second difference threshold may be set based on experience.

After determining the local maximum amplitude value of the target time point, the computer device may determine whether the local maximum amplitude value of the target time point is greater than the first amplitude threshold. If the local maximum amplitude value of the target time point is greater than the first amplitude threshold, the target time point is added as the target stress point into the target stress point set. The first amplitude threshold may be set based on experience and may be represented by Si. In an implementation, if the target time point is any initial stress point in the initial stress point set, the first amplitude threshold may be set to a small value. For example, the first amplitude threshold may be set to 0.1. In another implementation, if the target time point is any supplementary point in the supplementary time point set, to avoid false detection of the target time point, the first amplitude threshold may be properly increased. For example, after the set $R_0$ is determined, secondary screening may be performed on the stress points in the set $R_0$ according to the local maximum amplitude value of the stress points in the set $R_0$ to obtain the latest target stress point set $R_1$. All stress point sets in the latest target point stress set satisfy formula 1.7:

$$R_1=\{i:A[i]>s_1, i\in R_0\}\qquad \text{Formula 1.7}$$

A[i] represents an $i^{th}$ time point in $R_0$. $S_1$ is the first amplitude threshold.

In practice, there are a small quantity of stress points deviating from the main beat in the audio data. Therefore, in the embodiments of this application, the stress points may also be supplemented. In an implementation, musical note starting points may be screened to supplement the stress points in the target stress point set. The computer device may extract a musical note starting point of at least one musical note from the target audio data according to a musical note starting point detection algorithm (such as the librosa.onset algorithm). A musical note is determined according to at least two time points and audio amplitude values corresponding to the at least two time points. The musical note starting point refers to: the earliest time point in at least two time points corresponding to a musical note. Further, the computer device acquires an energy evaluation value of the musical note starting point and a local maximum amplitude value of the musical note starting point, and determines whether the energy evaluation value of the musical note starting point and the local maximum amplitude value of the musical note starting point satisfy a stress condition. If the energy evaluation value and the local maximum amplitude value of the musical note starting point satisfy the stress condition, the musical note starting point is added as the target stress point into the target stress point set. The stress condition includes at least one of the following: the energy evaluation value of the musical note starting point being greater than an energy evaluation threshold, and the local maximum amplitude value of the musical note starting point being greater than a second amplitude threshold.

In an embodiment, the target stress point in the target stress point set may be at the peak of energy change, so when the target stress point is perceived, the target stress point may be about to disappear. Therefore, such a target stress point is not ideal. Based on this, the computer device may further optimize the target stress point in the target stress point set. For any target stress point in the target stress point set, the computer device acquires a musical note starting point of a target musical note to which any target stress point pertains, and replaces the target stress point with the musical note starting point of the target musical note in the target stress point set. It may be understood that the musical note starting point may also be regarded as a stress point. In a specific implementation, the computer device acquires a musical note starting point intensity evaluation curve of the target audio data. The musical note starting point intensity evaluation curve includes a plurality of time points arranged in chronological order and a musical note intensity value of each time point. Then, any target stress point is mapped to the musical note starting point intensity evaluation curve to obtain a target position of the target stress point on the musical note starting point intensity evaluation curve. At least one musical note intensity value is traversed sequentially along a direction of decreasing time based on the target position on the musical note starting point intensity evaluation curve. If a current musical note intensity value traversed currently satisfies a musical note intensity condition, the traversing is stopped, and a current time point corresponding to the current musical note intensity value is used as a musical note starting point of a target musical note to which the target stress point pertains. The musical note intensity condition includes: a musical note intensity value of a time point located before the current time point and adjacent to the current time point being greater than or equal to the current musical note intensity value, and a musical note intensity value of a time point located after the current time point and adjacent to the current time point being greater than the current musical note intensity value.

Figure 5C:
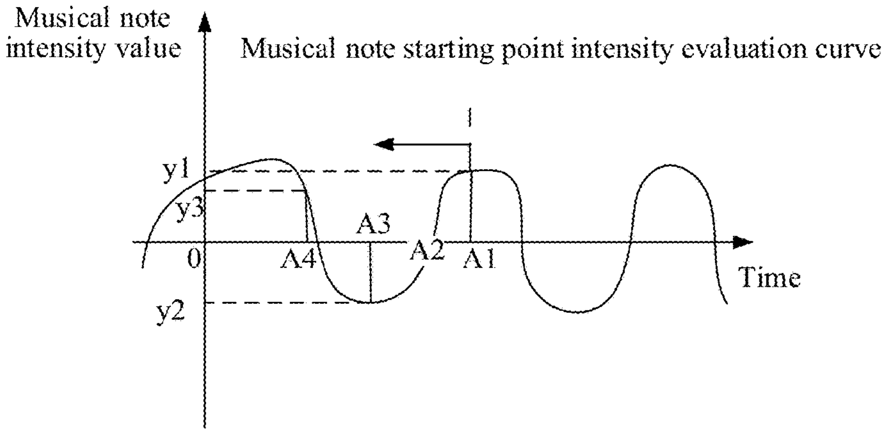
FIG. 5C is a schematic diagram of determining a musical note starting point according to a target time point according to an embodiment of this application.

In an implementation, for example, the musical note starting point intensity evaluation curve is shown in FIG. 5C, the computer device maps a certain target stress point to the musical note starting point intensity evaluation curve to obtain a target position A1 of the target stress point on the musical note starting point intensity evaluation curve. The computer device traverses at least one musical note intensity value sequentially along a direction of decreasing time (the direction indicated by the arrow in FIG. 5C) based on A1. When it is traversed that the musical note intensity value is 0 (corresponding to a time point A2), the musical note intensity value is greater than a musical note intensity value y2, then the next musical note intensity value y2 (corresponding to a time point A3) is traversed. In this case, the musical note intensity value y2 is less than the musical note intensity value 0 and a musical note intensity value y3 (corresponding to a time point A4), then the traversing is stopped, and the time point A3 corresponding to the musical note intensity value y2 is used as a musical note starting point of a target musical note to which the target stress point pertains.

Figure 5D:
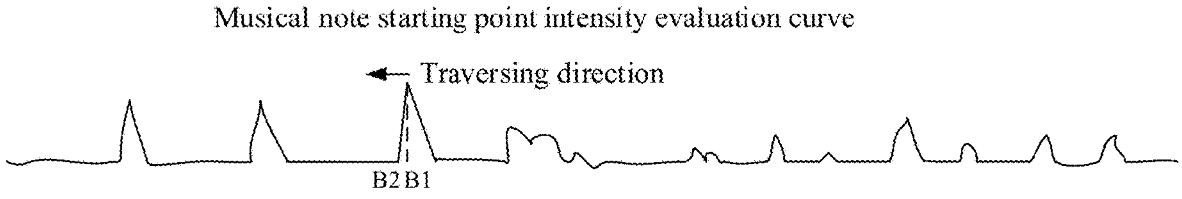
FIG. 5D is a schematic diagram of determining a musical note starting point according to a target time point according to an embodiment of this application.

In another implementation, for example, the musical note starting point intensity evaluation curve is shown in FIG. 5D, the computer device maps a target stress point to the musical note starting point intensity evaluation curve to obtain a target position B1 of the target stress point on the musical note starting point intensity evaluation curve. The computer device traverses at least one musical note intensity value sequentially along a direction of decreasing time (the direction indicated by the arrow in FIG. 5D) based on B1. When it is traversed that the musical note intensity value is 0 (corresponding to a time point B2), the musical note intensity value is less than a musical note intensity value corresponding to B1, a musical note intensity value of a time point located before B2 and adjacent to B2 is equal to the current musical note intensity value 0, and a musical note intensity value of a time point located after B2 and adjacent to B2 is greater than the current musical note intensity value 0, then the traversing is stopped, and the time point B2 corresponding to the musical note intensity value 0 is used as a musical note starting point of a target musical note to which the target stress point pertains.

A specific implementation for the computer device to acquire the musical note starting point intensity evaluation curve of the target audio data may be as follows. The computer device may convert the time domain into the frequency domain by the short-time Fourier transform (stft) according to the target audio data to finally generate a frequency spectrum, then acquire a difference between frames before and after of the frequency spectrum, and sum up according to the difference between frames to obtain the musical note starting point intensity evaluation curve.

After the target stress point set is obtained, the target stress point in the target stress point set may be converted into a format required by an application and then outputted. The application may be a player dedicated to playing music, video software, or the like.

In an embodiment of this application, the computer device may acquire a target time point and a reference point of the target time point from target audio data, and then the computer device performs energy evaluation on the target time point according to an audio amplitude value of the target time point to obtain an energy evaluation value of the target time point. Then, energy evaluation is performed on the reference point according to an audio amplitude value of the reference point to obtain an energy evaluation value of the reference point. Accuracy verification is performed on the target time point according to the energy evaluation value of the target time point and the energy evaluation value of the reference point. If the accuracy verification on the target time point succeeds, the target time point is added as a target stress point into a target stress point set. In the above process of audio detection, the accuracy verification is performed on the target time point by using the correlation between the adjacent reference point and the target time point, so that the extraction accuracy of stress points can be effectively improved, thereby providing a target stress point set accurate to the frame level (that is, the time point level).

Figure 6:
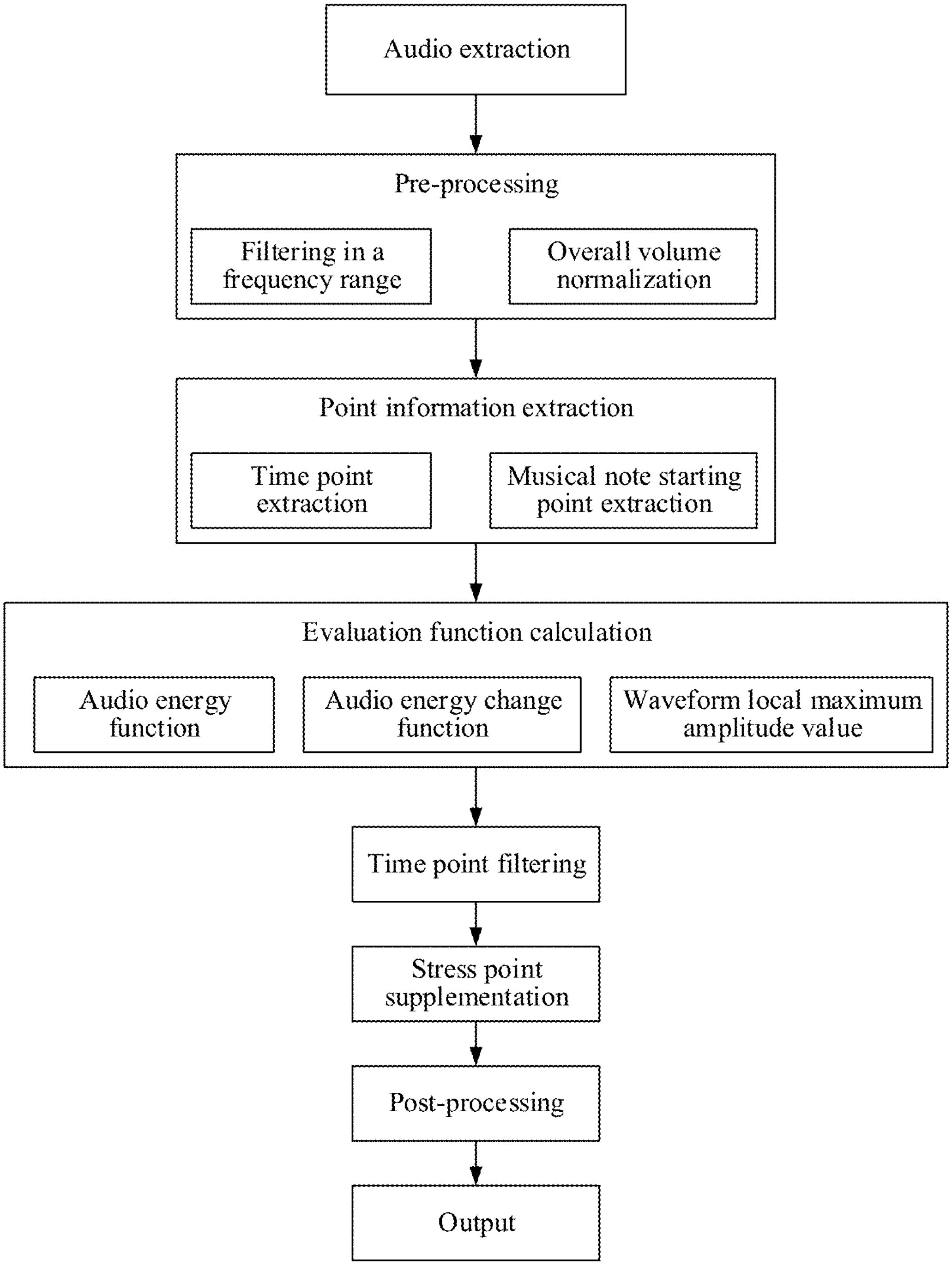
FIG. 6 is a schematic flowchart of an audio detection solution according to an embodiment of this application.

Based on the above audio detection method provided in the embodiments of this application, an embodiment of this application further provides a specific audio detection solution. The specific process of the audio detection solution may refer to FIG. 6. The process of the audio detection solution is as follows. When audio data is extracted, encoding formats of different audio files may be unified first. The computer device first set the unified encoding format of audio files. Then, the computer device processes a video according to the set encoding format, then extracts the audio data from the processed video, and pre-processes the audio data. The pre-processing includes filtering the audio data in a frequency range and performing overall volume normalization on the audio data. After pre-processing the audio data, the computer device performs point information extraction from the pre-processed audio data. The point information extraction includes target time point extraction and musical note starting point extraction. The target time point is evaluated according to an audio energy function, an audio energy change function, and a waveform local maximum amplitude function. The target time point is screened and filtered according to an evaluation result to obtain a target stress point set. Further, after obtaining the target stress point set, the computer device may also supplement stress points, add the supplemented stress points as the target stress points into the target stress point set, optimize the target stress points in the target stress point set to obtain a final target stress point set, and output the target stress point set, so as to accurately determine the stress points in the target audio data.

In a specific application, after the stress points are determined, the stress points may be marked in the target audio data. Subsequently, time points for picture switching may be provided for editing tools or content creators according to the marked stress points to automatically generate or assist in creating sync-to-beat videos characterized by synchronizing the picture with the stress rhythm point of the music, so that the audience can feel a consistent sense of rhythm visually and auditorily, thereby bringing a more comfortable sensory experience. Alternatively, the marked stress points may be used as background music points in secondary creation or editing of videos. Alternatively, the marked stress points may play the role of matching lighting or other special effects on the stage or scene, promoting the atmosphere, and the like.

Figure 7:
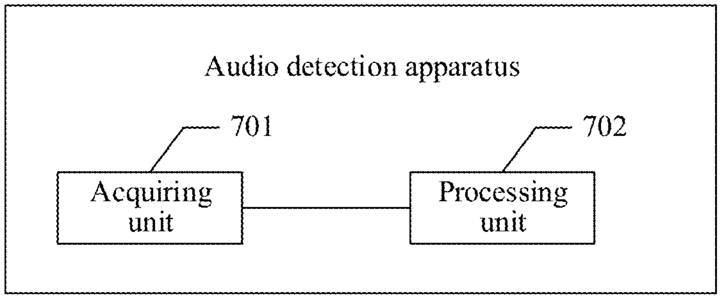
FIG. 7 is a schematic structural diagram of an audio detection apparatus according to an embodiment of this application.

Based on the foregoing description of the embodiments of the audio detection method, an embodiment of this application further discloses an audio detection apparatus. The audio detection apparatus may be a hardware component disposed in the computer device mentioned above or a computer program (including program code) run on the computer device mentioned above. The audio detection apparatus may perform the method shown in FIG. 2 or FIG. 4. Referring to FIG. 7, the audio detection apparatus may operate the following units:

an acquiring unit 701, configured to acquire a target time point and a reference point of the target time point from target audio data, the target audio data including a plurality of time points and an audio amplitude value of each time point, and the reference point referring to a time point with a time difference from the target time point being less than a first difference threshold;

a processing unit 702, configured to perform energy evaluation on the target time point according to an audio amplitude value of the target time point to obtain an energy evaluation value of the target time point; and perform energy evaluation on the reference point according to an audio amplitude value of the reference point to obtain an energy evaluation value of the reference point;

the processing unit 702, further configured to perform accuracy verification on the target time point according to the energy evaluation value of the target time point and the energy evaluation value of the reference point; and the processing unit 702, further configured to, when the accuracy verification on the target time point succeeds, add the target time point as a target stress point into a target stress point set.

In an implementation, the processing unit 702 is further configured to:

calculate an energy mean of the energy evaluation value of the reference point and the energy evaluation value of the target time point;

determine a maximum energy evaluation value from the energy evaluation value of the target time point and the energy evaluation value of the reference point;

when a difference between the maximum energy evaluation value and the energy mean is greater than a threshold, determine that the accuracy verification on the target time point succeeds; and when the difference between the maximum energy evaluation value and the energy mean is not greater than the threshold, determine that the accuracy verification on the target time point fails.

In an implementation, the acquiring unit 701 is further configured to: acquire a plurality of associated points of the target time point from the plurality of time points;

the processing unit 702 is further configured to: calculate an audio energy value of the target time point by using an audio energy function according to audio amplitude values of the associated points and the audio amplitude value of the target time point, the associated point referring to a time point with a time difference from the target time point being less than a second difference threshold;

the acquiring unit 701 is further configured to: acquire a preceding point of the target time point from the plurality of time points, the preceding point including: c time points selected forward in sequence based on an arrangement position of the target time point in the plurality of time points, c being a positive integer; and the processing unit 702 is further configured to: calculate an audio energy change value of the target time point by using an audio energy change function according to the audio energy value of the target time point and audio energy values of time points in the preceding point; and perform weighted summation on the audio energy value and the audio energy change value to obtain the energy evaluation value of the target time point.

In an implementation, the processing unit 702 is further configured to:

perform a square operation on the audio amplitude value of the target time point to obtain an initial energy value of the target time point; perform a square operation on the audio amplitude value of each associated point to obtain an initial energy value of each associated point; and perform a mean operation on the initial energy value of the target time point and initial energy values of the associated points to obtain the audio energy value of the target time point.

In an implementation, the processing unit 702 is further configured to:

perform a mean operation on the initial energy value of the target time point and the initial energy values of the associated points to obtain an intermediate energy value; and denoise the intermediate energy value to obtain the audio energy value of the target time point.

In an implementation, the processing unit 702 is further configured to: calculate a sum of the audio energy values of the time points in the preceding point;

the acquiring unit 701 is configured to acquire a reference value; and the processing unit 702 is further configured to: calculate a difference between the sum of the audio energy values and c times the audio energy value of the target time point; use a maximum value in the reference value and the obtained difference through calculation as an initial energy change value of the target time point; and determine the audio energy change value of the target time point according to the initial energy change value of the target time point.

In an implementation, the acquiring unit 701 is configured to acquire initial energy change values of time points in the target audio data; and the processing unit 702 is further configured to: determine a plurality of peaks from the initial energy change values of the time points, each peak referring to an initial energy change value of a peak time point in the target audio data, and the peak time point satisfying the following condition: the initial energy change value of the peak time point being greater than an initial energy change value of each of two time points respectively on left and right sides of the peak time point and adjacent to the peak time point; and normalize the initial energy change value of the target time point by using a mean of the plurality of peaks to obtain the audio energy change value of the target time point.

In an implementation, the acquiring unit 701 is configured to acquire audio energy values of time points; and the processing unit 702 is further configured to determine a minimum audio energy value from the audio energy values of the time points; and perform contraction on the initial energy change value of the target time point by using the mean of the plurality of peaks and the minimum audio energy value to obtain the audio energy change value of the target time point.

In an implementation, before the adding the target time point as a target stress point into a target stress point set, the processing unit 702 is further configured to:

select, from absolute values of audio amplitude values of the associated points and an absolute value of the audio amplitude value of the target time point, a maximum absolute value as a local maximum amplitude value of the target time point; and when the local maximum amplitude value of the target time point is greater than a first amplitude threshold, perform the operation of adding the target time point as a target stress point into a target stress point set.

In an implementation, the target time point is any initial stress point in an initial stress point set or any supplementary point in a supplementary time point set; a plurality of stress points in the initial stress point set are obtained by performing point extraction on the target audio data by using a point extraction algorithm; and the plurality of time points in the target audio data are arranged in chronological order, and the processing unit 702 is further configured to:

determine a starting stress point and an ending stress point from the initial stress point set, the starting stress point referring to the earliest stress point in the initial stress point set, and the ending stress point referring to the latest stress point in the initial stress point set;

determine a starting arrangement position of the starting stress point in the target audio data and an end arrangement position of the ending stress point in the target audio data;

perform, according to a sampling frequency, extended sampling of a time point located before the starting arrangement position in the target audio data, and perform, according to the sampling frequency, extended sampling of a time point located after the end arrangement position in the target audio data; and use the time point obtained through extended sampling as a supplementary point, and add the supplementary point into the supplementary time point set.

In an implementation, the processing unit 702 is further configured to: extract a musical note starting point of at least one musical note from the target audio data, a musical note being determined according to at least two time points and audio amplitude values corresponding to the at least two time points, and the musical note starting point referring to: the earliest time point in at least two time points corresponding to a musical note;

the acquiring unit 701 is further configured to acquire an energy evaluation value of the musical note starting point and a local maximum amplitude value of the musical note starting point; and the processing unit 702 is further configured to: when the energy evaluation value and the local maximum amplitude value of the musical note starting point satisfy a stress condition, add the musical note starting point as the target stress point into the target stress point set, the stress condition including at least one of the following: the energy evaluation value of the musical note starting point being greater than an energy evaluation threshold, and the local maximum amplitude value of the musical note starting point being greater than a second amplitude threshold.

In an embodiment, the acquiring unit 701 is further configured to acquire, for any target stress point in the target stress point set, a musical note starting point of a target musical note to which the target stress point pertains; and the processing unit 702 is further configured to replace the target stress point with the musical note starting point of the target musical note in the target stress point set.

In an embodiment, the acquiring unit 701 is further configured to acquire a musical note starting point intensity evaluation curve of the target audio data, the musical note starting point intensity evaluation curve including the plurality of time points arranged in chronological order and a musical note intensity value of each time point; and the processing unit 702 is further configured to: map any target stress point to the musical note starting point intensity evaluation curve to obtain a target position of the target stress point on the musical note starting point intensity evaluation curve; traverse at least one musical note intensity value sequentially along a direction of decreasing time based on the target position on the musical note starting point intensity evaluation curve; and when a current musical note intensity value traversed currently satisfies a musical note intensity condition, stop traversing, and use a current time point corresponding to the current musical note intensity value as the musical note starting point of the target musical note to which the target stress point pertains, the musical note intensity condition including: a musical note intensity value of a time point located before the current time point and adjacent to the current time point being greater than or equal to the current musical note intensity value, and a musical note intensity value of a time point located after the current time point and adjacent to the current time point being greater than the current musical note intensity value.

In an implementation, before the acquiring a target time point and a reference point of the target time point from target audio data, the acquiring unit 701 is further configured to acquire original audio data, each time point in the original audio data having a corresponding sound frequency; and the processing unit 702 is further configured to preprocess the original audio data to obtain the target audio data, the pre-processing including at least one of the following: filtering the original audio data by using a target frequency range, and performing volume normalization on the original audio data or the filtered audio data.

According to an embodiment of this application, the steps involved in the method shown in FIG. 2 or FIG. 4 may be performed by the units of the audio detection apparatus shown in FIG. 7. In an example, step S201 shown in FIG. 2 may be performed by the acquiring unit 701 shown in FIG. 7, and steps S202 to S204 may be performed by the processing unit 702 shown in FIG. 7. In another example, step S401 shown in FIG. 4 may be performed by the acquiring unit 701 shown in FIG. 7, and steps S402 to S406 may be performed by the processing unit 702 shown in FIG. 7.

According to another embodiment of this application, the units of the audio detection apparatus shown in FIG. 7 may be separately or wholly combined into one or several other units, or one (or more) of the units herein may further be divided into a plurality of units of smaller functions. In this way, the same operations may be implemented, and the implementation of the technical effects of the embodiments of this application is not affected. The foregoing units are divided based on logical functions. In an actual application, a function of one unit may also be implemented by a plurality of units, or functions of a plurality of units are implemented by one unit. In other embodiments of this application, the audio detection apparatus may also include other units. In an actual application, the functions may also be cooperatively implemented by other units and may be cooperatively implemented by a plurality of units.

According to another embodiment of this application, the steps of the audio detection method or the functions of the audio detection apparatus may be implemented by processing components and storage elements including a central processing unit (CPU), a random access memory (RAM), a read-only memory (ROM), and the like. For example, a computer program (including program code) that can perform the steps involved in the corresponding method shown in FIG. 2 or FIG. 4 may run on a general computing device of a computer to construct the audio detection apparatus shown in FIG. 7 and implement the audio detection method in the embodiments of this application. The computer program may be recorded in, for example, a computer-readable recording medium, and may be loaded into the foregoing computer device by using the computer-readable recording medium, and run on the computer device.

Figure 8:
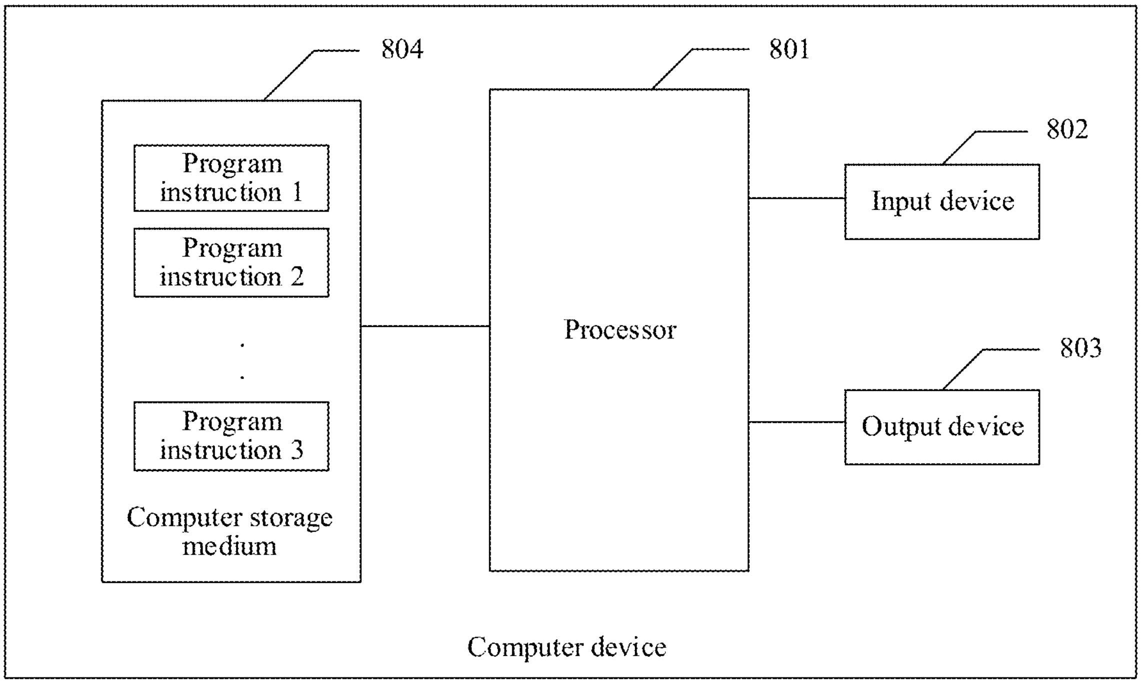
FIG. 8 is a schematic structural diagram of a computer device according to an embodiment of this application.

Based on the above description of the embodiments of the audio detection method, an embodiment of this application further discloses a computer device. Referring to FIG. 8, the computer device may include at least a processor 801, an input device 802, an output device 803, and a computer storage medium 804. In the computer device, the processor 801, the input device 802, the output device 803, and the computer storage medium 804 may be connected by a bus or in another manner.

The computer storage medium 804 is a memory device in the computer device and is configured to store programs and data. It may be understood that the computer storage medium 804 herein may include an internal storage medium of the computer device and certainly may also include an extended storage medium supported by the computer device. The computer storage medium 804 provides storage space, and the storage space stores an operating system of the computer device. In addition, the storage space further stores one or more instructions suitable to be loaded and executed by the processor 801. The instructions may be one or more computer programs (including program code). It is to be noted that, the computer storage medium herein may be a high-speed RAM memory. In an embodiment, the computer storage medium may be at least one computer storage medium far away from the above processor. The processor may be referred to as a CPU, which is a core and a control core of the computer device, is suitable for implementing one or more instructions, and is specifically suitable for loading and executing one or more instructions to implement the corresponding method procedure or function.

In an embodiment, the processor 801 may load and execute one or more first instructions stored in the computer storage medium, to implement the corresponding steps in the embodiments of the audio detection method above. In a specific implementation, the one or more first instructions in the computer storage medium are loaded and executed by the processor 801 to perform the following operations:

acquiring a target time point and a reference point of the target time point from target audio data, the target audio data including a plurality of time points and an audio amplitude value of each time point, and the reference point referring to a time point with a time difference from the target time point being less than a first difference threshold;

performing energy evaluation on the target time point according to an audio amplitude value of the target time point to obtain an energy evaluation value of the target time point; performing energy evaluation on the reference point according to an audio amplitude value of the reference point to obtain an energy evaluation value of the reference point;

performing accuracy verification on the target time point according to the energy evaluation value of the target time point and the energy evaluation value of the reference point; and when the accuracy verification on the target time point succeeds, adding the target time point as a target stress point into a target stress point set.

In an implementation, the processor 801 is further configured to:

calculate an energy mean of the energy evaluation value of the reference point and the energy evaluation value of the target time point;

determine a maximum energy evaluation value from the energy evaluation value of the target time point and the energy evaluation value of the reference point;

when a difference between the maximum energy evaluation value and the energy mean is greater than a threshold, determine that the accuracy verification on the target time point succeeds; and when the difference between the maximum energy evaluation value and the energy mean is not greater than the threshold, determine that the accuracy verification on the target time point fails.

In an implementation, the plurality of time points are arranged in chronological order; and the processor 801 is further configured to:

acquire a plurality of associated points of the target time point from the plurality of time points, and calculate an audio energy value of the target time point by using an audio energy function according to audio amplitude values of the associated points and the audio amplitude value of the target time point, the associated point referring to a time point with a time difference from the target time point being less than a second difference threshold;

acquire a preceding point of the target time point from the plurality of time points, the preceding point including: c time points selected forward in sequence based on an arrangement position of the target time point in the plurality of time points, c being a positive integer;

calculate an audio energy change value of the target time point by using an audio energy change function according to the audio energy value of the target time point and audio energy values of time points in the preceding point; and perform weighted summation on the audio energy value and the audio energy change value to obtain the energy evaluation value of the target time point.

In an implementation, the processor 801 is further configured to:

perform a square operation on the audio amplitude value of the target time point to obtain an initial energy value of the target time point; perform a square operation on the audio amplitude value of each associated point to obtain an initial energy value of each associated point; and perform a mean operation on the initial energy value of the target time point and initial energy values of the associated points to obtain the audio energy value of the target time point.

In an implementation, the processor 801 is further configured to:

perform a mean operation on the initial energy value of the target time point and the initial energy values of the associated points to obtain an intermediate energy value; and denoise the intermediate energy value to obtain the audio energy value of the target time point.

In an implementation, the processor 801 is further configured to:

calculate a sum of the audio energy values of the time points in the preceding point;

acquire a reference value, and calculate a difference between the sum of the audio energy values and c times the audio energy value of the target time point;

use a maximum value in the reference value and the obtained difference through calculation as an initial energy change value of the target time point; and determine the audio energy change value of the target time point according to the initial energy change value of the target time point.

In an implementation, the processor 801 is further configured to:

acquire initial energy change values of time points in the target audio data;

determine a plurality of peaks from the initial energy change values of the time points, each peak referring to an initial energy change value of a peak time point in the target audio data, and the peak time point satisfying the following condition: the initial energy change value of the peak time point being greater than an initial energy change value of each of two time points respectively on left and right sides of the peak time point and adjacent to the peak time point; and normalize the initial energy change value of the target time point by using a mean of the plurality of peaks to obtain the audio energy change value of the target time point.

In an implementation, the processor 801 is further configured to:

acquire audio energy values of time points, and determine a minimum audio energy value from the audio energy values of the time points; and perform contraction on the initial energy change value of the target time point by using the mean of the plurality of peaks and the minimum audio energy value to obtain the audio energy change value of the target time point.

In an implementation, before the adding the target time point as a target stress point into a target stress point set, the processor 801 is further configured to:

select, from absolute values of audio amplitude values of the associated points and an absolute value of the audio amplitude value of the target time point, a maximum absolute value as a local maximum amplitude value of the target time point; and when the local maximum amplitude value of the target time point is greater than a first amplitude threshold, perform the operation of adding the target time point as a target stress point into a target stress point set.

In an implementation, the target time point is any initial stress point in an initial stress point set or any supplementary point in a supplementary time point set; a plurality of stress points in the initial stress point set are obtained by performing point extraction on the target audio data by using a point extraction algorithm; and the plurality of time points in the target audio data are arranged in chronological order, and the processor 801 is further configured to: determine a starting stress point and an ending stress point from the initial stress point set, the starting stress point referring to the earliest stress point in the initial stress point set, and the ending stress point referring to the latest stress point in the initial stress point set;

determine a starting arrangement position of the starting stress point in the target audio data and an end arrangement position of the ending stress point in the target audio data;

perform, according to a sampling frequency, extended sampling of a time point located before the starting arrangement position in the target audio data, and perform, according to the sampling frequency, extended sampling of a time point located after the end arrangement position in the target audio data; and use the time point obtained through extended sampling as a supplementary point, and add the supplementary point into the supplementary time point set.

In an implementation, the processor 801 is further configured to:

extract a musical note starting point of at least one musical note from the target audio data, a musical note being determined according to at least two time points and audio amplitude values corresponding to the at least two time points, and the musical note starting point referring to: the earliest time point in at least two time points corresponding to a musical note;

acquire an energy evaluation value of the musical note starting point and a local maximum amplitude value of the musical note starting point; and when the energy evaluation value and the local maximum amplitude value of the musical note starting point satisfy a stress condition, add the musical note starting point as the target stress point into the target stress point set, the stress condition including at least one of the following: the energy evaluation value of the musical note starting point being greater than an energy evaluation threshold, and the local maximum amplitude value of the musical note starting point being greater than a second amplitude threshold.

In an implementation, the processor 801 is further configured to:

acquire, for any target stress point in the target stress point set, a musical note starting point of a target musical note to which the target stress point pertains; and replace the target stress point with the musical note starting point of the target musical note in the target stress point set.

In an implementation, the processor 801 is further configured to:

acquire a musical note starting point intensity evaluation curve of the target audio data, the musical note starting point intensity evaluation curve including the plurality of time points arranged in chronological order and a musical note intensity value of each time point;

map any target stress point to the musical note starting point intensity evaluation curve to obtain a target position of the target stress point on the musical note starting point intensity evaluation curve;

traverse at least one musical note intensity value sequentially along a direction of decreasing time based on the target position on the musical note starting point intensity evaluation curve; and when a current musical note intensity value traversed currently satisfies a musical note intensity condition, stop traversing, and use a current time point corresponding to the current musical note intensity value as the musical note starting point of the target musical note to which the target stress point pertains, the musical note intensity condition including: a musical note intensity value of a time point located before the current time point and adjacent to the current time point being greater than or equal to the current musical note intensity value, and a musical note intensity value of a time point located after the current time point and adjacent to the current time point being greater than the current musical note intensity value.

In an implementation, before the acquiring a target time point and a reference point of the target time point from target audio data, the processor 801 is further configured to:

acquire original audio data, each time point in the original audio data having a corresponding sound frequency; and pre-process the original audio data to obtain the target audio data, the pre-processing including at least one of the following: filtering the original audio data by using a target frequency range, and performing volume normalization on the original audio data or the filtered audio data.

It is to be noted that, an embodiment of this application further provides a computer program product or a computer program. The computer program product or the computer program includes a computer instruction, and the computer instruction is stored in a computer-readable storage medium. The processor of the computer device reads the computer instruction from the computer-readable storage medium, and the processor executes the computer instruction, to cause the computer device to perform the steps in the embodiments of the audio detection method in FIG. 2 or FIG. 4.

A person skilled in the art may understand that all or some of the procedures of the methods of the foregoing embodiments may be implemented by a computer program instructing relevant hardware. The program may be stored in a computer-readable storage medium. When the program is executed, the procedures of the foregoing method embodiments may be implemented. The foregoing storage medium may be a magnetic disk, an optical disc, a ROM, a RAM, or the like.

In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. The contents disclosed above are merely exemplary embodiments of this application, but not intended to limit the scope of this application. A person of ordinary skill in the art can understand all or a part of the procedures for implementing the foregoing embodiments, and any equivalent variation made by them according to the claims of this application shall still fall within the scope of this application.

What is claimed is:

1. An audio detection method performed by a computer device, the method comprising:

acquiring a target time point and a reference point of the target time point from target audio data, the target audio data comprising a plurality of time points and an audio amplitude value for each time point, and the reference point referring to a time point with a time difference from the target time point being less than a first difference threshold;

performing energy evaluation on the target time point according to an audio amplitude value of the target time point to obtain an energy evaluation value of the target time point;

performing energy evaluation on the reference point according to an audio amplitude value of the reference point to obtain an energy evaluation value of the reference point; and performing accuracy verification on the target time point according to the energy evaluation value of the target time point and the energy evaluation value of the reference point, including:

calculating an energy mean of the energy evaluation value of the reference point and the energy evaluation value of the target time point;

determining a maximum energy evaluation value from the energy evaluation value of the target time point and the energy evaluation value of the reference point; and when a difference between the maximum energy evaluation value and the energy mean is greater than a threshold:

determining that the accuracy verification on the target time point succeeds; and adding the target time point as a target stress point into a target stress point set.

2. The method according to claim 1, wherein performing the accuracy verification on the target time point according to the energy evaluation value of the target time point and the energy evaluation value of the reference point further comprises:

when the difference between the maximum energy evaluation value and the energy mean is not greater than the threshold, determining that the accuracy verification on the target time point fails.

3. The method according to claim 1, wherein:

the plurality of time points are arranged in chronological order; and performing the energy evaluation on the target time point according to the audio amplitude value of the target time point to obtain the energy evaluation value of the target time point comprises:
- acquiring a plurality of associated points of the target time point from the plurality of time points, and calculating an audio energy value of the target time point by using an audio energy function according to audio amplitude values of the associated points and the audio amplitude value of the target time point, the associated point referring to a time point with a time difference from the target time point being less than a second difference threshold;
- acquiring a preceding point of the target time point from the plurality of time points, the preceding point comprising c time points selected forward in sequence based on an arrangement position of the target time point in the plurality of time points, c being a positive integer;
- calculating an audio energy change value of the target time point by using an audio energy change function according to the audio energy value of the target time point and audio energy values of time points in the preceding point; and
- performing weighted summation on the audio energy value and the audio energy change value to obtain the energy evaluation value of the target time point.

4. The method according to claim 3, wherein the calculating an audio energy value of the target time point by using an audio energy function according to audio amplitude values of the associated points and the audio amplitude value of the target time point comprises:
- performing a square operation on the audio amplitude value of the target time point to obtain an initial energy value of the target time point; performing a square operation on the audio amplitude value of each associated point to obtain an initial energy value of each associated point; and
- performing a mean operation on the initial energy value of the target time point and initial energy values of the associated points to obtain the audio energy value of the target time point.

5. The method according to claim 4, wherein the performing a mean operation on the initial energy value of the target time point and initial energy values of the associated points to obtain the audio energy value of the target time point comprises:
- performing a mean operation on the initial energy value of the target time point and the initial energy values of the associated points to obtain an intermediate energy value; and
- denoising the intermediate energy value to obtain the audio energy value of the target time point.

6. The method according to claim 3, wherein the calculating an audio energy change value of the target time point by using an audio energy change function according to the audio energy value of the target time point and audio energy values of time points in the preceding point comprises:
- calculating a sum of the audio energy values of the time points in the preceding point;
- acquiring a reference value, and calculating a difference between the sum of the audio energy values and c times the audio energy value of the target time point;
- using a maximum value in the reference value and the calculated difference through calculation as an initial energy change value of the target time point; and
- determining the audio energy change value of the target time point according to the initial energy change value of the target time point.

7. The method according to claim 6, wherein the determining the audio energy change value of the target time point according to the initial energy change value of the target time point comprises:
- acquiring initial energy change values of time points in the target audio data;
- determining a plurality of peaks from the initial energy change values of the time points, each peak referring to an initial energy change value of a peak time point in the target audio data, and the peak time point satisfying the following condition: the initial energy change value of the peak time point being greater than an initial energy change value of each of two time points respectively on left and right sides of the peak time point and adjacent to the peak time point; and
- normalizing the initial energy change value of the target time point by using a mean of the plurality of peaks to obtain the audio energy change value of the target time point.

8. The method according to claim 7, wherein the normalizing the initial energy change value of the target time point by using a mean of the plurality of peaks to obtain the audio energy change value of the target time point comprises:
- acquiring audio energy values of time points, and determining a minimum audio energy value from the audio energy values of the time points; and
- performing contraction on the initial energy change value of the target time point by using the mean of the plurality of peaks and the minimum audio energy value to obtain the audio energy change value of the target time point.

9. The method according to claim 3, further comprising:
- before adding the target time point as a target stress point into a target stress point set:
  - selecting, from absolute values of audio amplitude values of the associated points and an absolute value of the audio amplitude value of the target time point, a maximum absolute value as a local maximum amplitude value of the target time point; and
  - when the local maximum amplitude value of the target time point is greater than a first amplitude threshold, adding the target time point as a target stress point into the target stress point set.

10. The method according to claim 1, wherein:
- the target time point is any initial stress point in an initial stress point set or any supplementary point in a supplementary time point set;
- a plurality of stress points in the initial stress point set are obtained by performing point extraction on the target audio data by using a point extraction algorithm; and
- the plurality of time points in the target audio data are arranged in chronological order, and the supplementary time point set is acquired by:
  - determining a starting stress point and an ending stress point from the initial stress point set, the starting stress point referring to the earliest stress point in the initial stress point set, and the ending stress point referring to the latest stress point in the initial stress point set;
  - determining a starting arrangement position of the starting stress point in the target audio data and an end arrangement position of the ending stress point in the target audio data;
  - performing, according to a sampling frequency, extended sampling of a time point located before the starting arrangement position in the target audio data, and performing, according to the sampling frequency, extended sampling of a time point located after the end arrangement position in the target audio data; and using the time point obtained through extended sampling as a supplementary point, and adding the supplementary point into the supplementary time point set.

11. The method according to claim 1, further comprising:

extracting a musical note starting point of at least one musical note from the target audio data, a musical note being determined according to at least two time points and audio amplitude values corresponding to the at least two time points, and the musical note starting point referring to: the earliest time point in at least two time points corresponding to a musical note;

acquiring an energy evaluation value of the musical note starting point and a local maximum amplitude value of the musical note starting point; and when the energy evaluation value and the local maximum amplitude value of the musical note starting point satisfy a stress condition, adding the musical note starting point as the target stress point into the target stress point set, the stress condition comprising at least one of the following: the energy evaluation value of the musical note starting point being greater than an energy evaluation threshold, and the local maximum amplitude value of the musical note starting point being greater than a second amplitude threshold.

12. The method according to claim 11, further comprising:

acquiring, for any target stress point in the target stress point set, a musical note starting point of a target musical note to which the target stress point pertains; and replacing the target stress point with the musical note starting point of the target musical note in the target stress point set.

13. The method according to claim 12, further comprising:

acquiring a musical note starting point intensity evaluation curve of the target audio data, the musical note starting point intensity evaluation curve comprising the plurality of time points arranged in chronological order and a musical note intensity value of each time point;

mapping any target stress point to the musical note starting point intensity evaluation curve to obtain a target position of the target stress point on the musical note starting point intensity evaluation curve;

traversing at least one musical note intensity value sequentially along a direction of decreasing time based on the target position on the musical note starting point intensity evaluation curve; and when a current musical note intensity value traversed currently satisfies a musical note intensity condition, stopping traversing, and using a current time point corresponding to the current musical note intensity value as the musical note starting point of the target musical note to which the target stress point pertains, the musical note intensity condition comprising: a musical note intensity value of a time point located before the current time point and adjacent to the current time point being greater than or equal to the current musical note intensity value, and a musical note intensity value of a time point located after the current time point and adjacent to the current time point being greater than the current musical note intensity value.

14. The method according to claim 1, wherein the method further comprises:

acquiring original audio data, each time point in the original audio data having a corresponding sound frequency; and pre-processing the original audio data to obtain the target audio data, the pre-processing comprising at least one of the following: filtering the original audio data by using a target frequency range, and performing volume normalization on the original audio data or the filtered audio data.

15. A computer device, comprising an input device, an output device, a processor, and a storage medium storing one or more instructions that, when executed by the processor, cause the computer device to perform an audio detection method including:

acquiring a target time point and a reference point of the target time point from target audio data, the target audio data comprising a plurality of time points and an audio amplitude value for each time point, and the reference point referring to a time point with a time difference from the target time point being less than a first difference threshold;

performing energy evaluation on the target time point according to an audio amplitude value of the target time point to obtain an energy evaluation value of the target time point;

performing energy evaluation on the reference point according to an audio amplitude value of the reference point to obtain an energy evaluation value of the reference point;

performing accuracy verification on the target time point according to the energy evaluation value of the target time point and the energy evaluation value of the reference point, including:

calculating an energy mean of the energy evaluation value of the reference point and the energy evaluation value of the target time point;

determining a maximum energy evaluation value from the energy evaluation value of the target time point and the energy evaluation value of the reference point; and when a difference between the maximum energy evaluation value and the energy mean is greater than a threshold:

determining that the accuracy verification on the target time point succeeds; and adding the target time point as a target stress point into a target stress point set.

16. The computer device according to claim 15, wherein the method further comprises:

acquiring original audio data, each time point in the original audio data having a corresponding sound frequency; and pre-processing the original audio data to obtain the target audio data, the pre-processing comprising at least one of the following: filtering the original audio data by using a target frequency range, and performing volume normalization on the original audio data or the filtered audio data.

17. The computer device according to claim 15, wherein performing the accuracy verification on the target time point according to the energy evaluation value of the target time point and the energy evaluation value of the reference point further comprises:

when the difference between the maximum energy evaluation value and the energy mean is not greater than the threshold, determining that the accuracy verification on the target time point fails.

18. The computer device according to claim 15, wherein:

the plurality of time points are arranged in chronological order; and performing the energy evaluation on the target time point according to the audio amplitude value of the target time point to obtain the energy evaluation value of the target time point comprises:

acquiring a plurality of associated points of the target time point from the plurality of time points, and calculating an audio energy value of the target time point by using an audio energy function according to audio amplitude values of the associated points and the audio amplitude value of the target time point, the associated point referring to a time point with a time difference from the target time point being less than a second difference threshold;

acquiring a preceding point of the target time point from the plurality of time points, the preceding point comprising c time points selected forward in sequence based on an arrangement position of the target time point in the plurality of time points, c being a positive integer;

calculating an audio energy change value of the target time point by using an audio energy change function according to the audio energy value of the target time point and audio energy values of time points in the preceding point; and performing weighted summation on the audio energy value and the audio energy change value to obtain the energy evaluation value of the target time point.

19. The computer device according to claim 15, wherein the method further comprises:

extracting a musical note starting point of at least one musical note from the target audio data, a musical note being determined according to at least two time points and audio amplitude values corresponding to the at least two time points, and the musical note starting point referring to: the earliest time point in at least two time points corresponding to a musical note;

acquiring an energy evaluation value of the musical note starting point and a local maximum amplitude value of the musical note starting point; and when the energy evaluation value and the local maximum amplitude value of the musical note starting point satisfy a stress condition, adding the musical note starting point as the target stress point into the target stress point set, the stress condition comprising at least one of the following: the energy evaluation value of the musical note starting point being greater than an energy evaluation threshold, and the local maximum amplitude value of the musical note starting point being greater than a second amplitude threshold.

20. A non-transitory computer storage medium, storing one or more instructions that, when executed by a processor of a computer device, cause the computer device to perform an audio detection method including:

acquiring a target time point and a reference point of the target time point from target audio data, the target audio data comprising a plurality of time points and an audio amplitude value for each time point, and the reference point referring to a time point with a time difference from the target time point being less than a first difference threshold;

performing energy evaluation on the target time point according to an audio amplitude value of the target time point to obtain an energy evaluation value of the target time point; performing energy evaluation on the reference point according to an audio amplitude value of the reference point to obtain an energy evaluation value of the reference point;

performing accuracy verification on the target time point according to the energy evaluation value of the target time point and the energy evaluation value of the reference point, including:

calculating an energy mean of the energy evaluation value of the reference point and the energy evaluation value of the target time point;

determining a maximum energy evaluation value from the energy evaluation value of the target time point and the energy evaluation value of the reference point; and when a difference between the maximum energy evaluation value and the energy mean is greater than a threshold:

determining that the accuracy verification on the target time point succeeds; and adding the target time point as a target stress point into a target stress point set.

* * * * *